(12) United States Patent
Verma et al.

(10) Patent No.: US 11,732,654 B2
(45) Date of Patent: Aug. 22, 2023

(54) FEED-THROUGH ASSEMBLY

(71) Applicant: General Electric Company, Schenectady, NY (US)

(72) Inventors: Naleen Verma, Karnataka (IN); Daniel D. Smith, Mason, OH (US); Benjamin Schumacher, Symmes Township, OH (US); Arun Ramachandra, Karnataka (IN); Shivakumar Basavanna, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 120 days.

(21) Appl. No.: 17/207,392

(22) Filed: Mar. 19, 2021

(65) Prior Publication Data
US 2022/0298973 A1 Sep. 22, 2022

(51) Int. Cl.
*F02C 7/32* (2006.01)
*B64D 27/00* (2006.01)

(52) U.S. Cl.
CPC ............... *F02C 7/32* (2013.01); *B64D 27/00* (2013.01); *F05D 2220/323* (2013.01)

(58) Field of Classification Search
CPC ...... F02C 7/32; B64D 27/00; F05D 2220/323
See application file for complete search history.

(56) References Cited

U.S. PATENT DOCUMENTS

| | | | |
|---|---|---|---|
| 5,364,191 A | 11/1994 | Gruber | |
| 6,768,058 B2 * | 7/2004 | Pallapothu | B60R 16/0222 174/151 |
| 7,481,827 B2 | 1/2009 | Ryan et al. | |
| 8,888,396 B2 | 11/2014 | Halcom et al. | |
| 10,570,950 B2 | 2/2020 | Simpson et al. | |
| 2005/0123639 A1 * | 6/2005 | Ring | F16L 13/166 264/130 |
| 2007/0122232 A1 | 5/2007 | Buchner et al. | |
| 2019/0072127 A1 | 3/2019 | Boerschig | |
| 2019/0120284 A1 | 4/2019 | Koelln et al. | |
| 2019/0301035 A1 * | 10/2019 | Millward | F02C 3/06 |

FOREIGN PATENT DOCUMENTS

DE 2752456 A1 5/1979

* cited by examiner

*Primary Examiner* — Jacob M Amick
*Assistant Examiner* — Charles J Brauch
(74) *Attorney, Agent, or Firm* — Venable LLP; Aziz H. Poonawalla; Michele V. Frank

(57) ABSTRACT

A feed-through assembly for a bulkhead for moving and static engine components. The feed-through assembly can be configured to include flexible convolutions that allow for movement and sealing of the engine component relative to the bulkhead. In one aspect, a flexible convoluted spherical element can be provided in the feed-through assembly. In another aspect, a flexible convoluted bellow element can be provided in the feed-through assembly. These flexible convoluted elements can have multiple convolution sections including convolution sections with varying stiffness. The convolution sections can be configured to allow movement of the shaft relative to the bulkhead, including, transverse deflection and tilt.

19 Claims, 14 Drawing Sheets

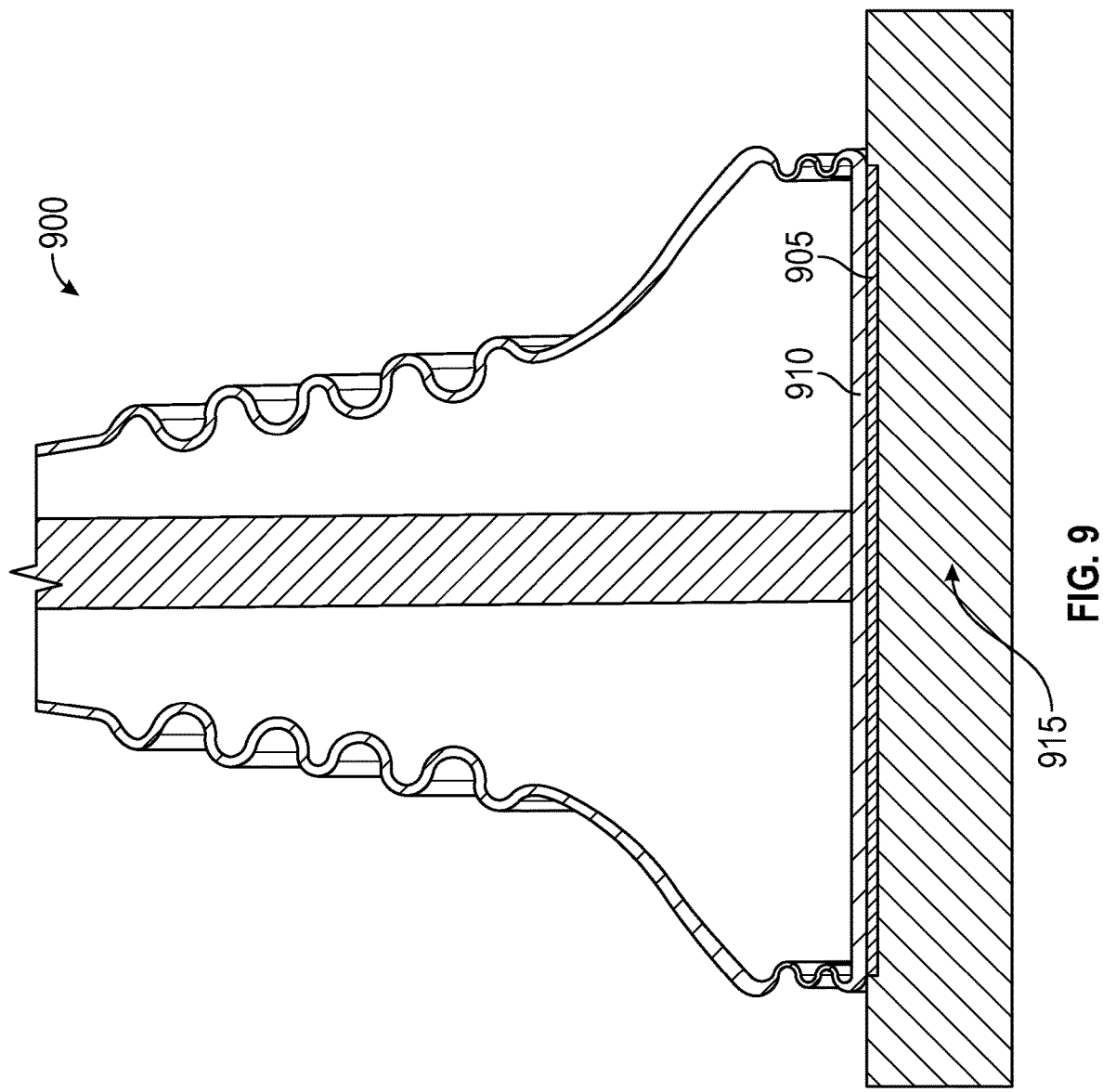

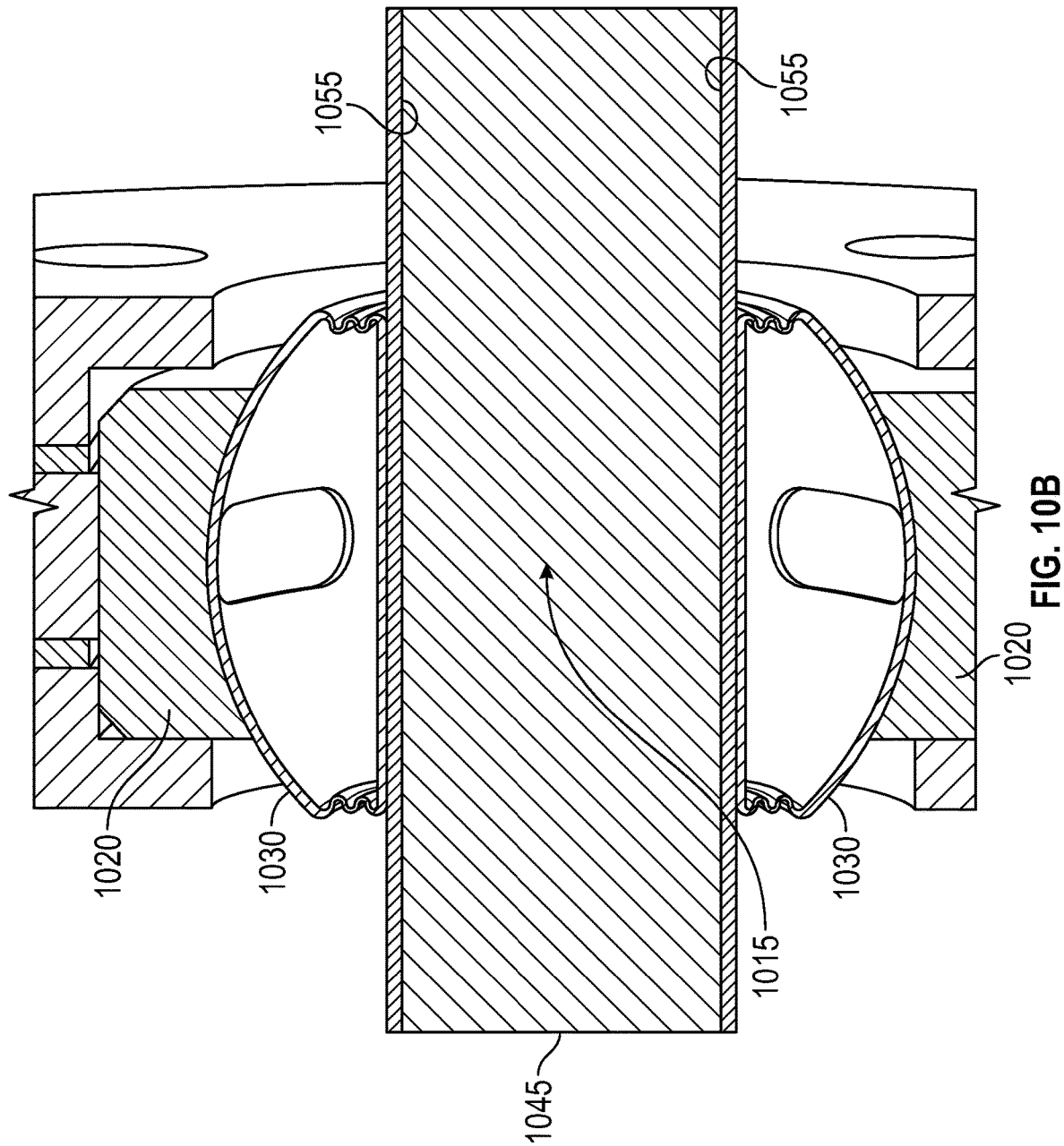

FEED-THROUGH ASSEMBLY

TECHNICAL FIELD

Some embodiments relate to feed-through assemblies, including firewall and bulkhead feed-through (BFT) assemblies. They further relate to bulkhead feed-through seal assemblies for moving and static engine components.

BACKGROUND

Complex machinery such as aeronautical engines in aircraft often have components or parts that pass from one section of the machine to another through a bulkhead. These bulkheads serve as internal firewalls, which protect occupants of the aircraft and sensitive portions of the machinery in the case of an emergency.

In order to accommodate the components or parts, the bulkheads require a bulkhead feed-through (BFT) assembly, also referred to as a pass-through, which allows the components or parts to pass through the bulkhead without compromising the bulkhead's integrity as a firewall. BFT assemblies may be required by law to adhere to fire prevention regulations such as in the United States, under United States 14 CFR ("Parts Applicable to Engines and Propellers"), in particular parts 23 ("Installation into Small Airplanes"), 25 ("Installation into Transport Category Airplanes"), and 33 ("Airworthiness Standards: Aircraft Engines").

In addition to the fire prevention requirement, the BFT assembly must also accommodate motion of the components or parts. Moving components or parts such as actuation rods, for example, (etc.) may need to slide back and forth through the bulkhead and/or rotate in order to couple moving parts on either side together. Static components or parts such as conduits, for example (etc.) may be subject to vibrational motion due to operation of the machinery. Other types of motion include but are not limited to tilting motion and translation.

BRIEF SUMMARY

According to an embodiment, a feed-through assembly for a bulkhead, that includes a channel configured to extend through the bulkhead and to allow a component to pass through the channel from a first side of the bulkhead to a second side of the bulkhead. The feed-through assembly also includes at least one convolution section extending around an end of the channel, where the convolution section is configured to allow a transverse deflection and a tilt of the component.

Additional features, advantages, and embodiments of the present disclosure are set forth or apparent from consideration of the following detailed description, drawings and claims. Moreover, it is to be understood that both the foregoing summary of the disclosure and the following detailed description are examples intended to provide further explanation without limiting the scope of the disclosure as claimed.

BRIEF DESCRIPTION OF THE DRAWINGS

The foregoing and other features and advantages will be apparent from the following, more particular, description of various example embodiments, as illustrated in the accompanying drawings, wherein like reference numbers generally indicate identical, functionally similar, and/or structurally similar elements.

FIG. 9 shows a cross-sectional view taken along line 8B-8B of the bulkhead feed-through shown in FIG. 8A with a dry film lubricant, according to another embodiment of the present disclosure.

FIG. 10B shows a magnified cross-sectional view taken along line 5B-5B of the bulkhead feed-through shown in FIG. 5A with a dry film lubricant, according to another embodiment of the present disclosure.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

This disclosure and various embodiments relate to a bulkhead feed-through (BFT) assembly (equivalently referred to as a pass-through). These BFT assemblies can be applied across various technologies and industries. Various embodiments may be described herein in the context of aeronautical engines and aircraft machinery.

In order to comply with fire prevention regulations and to function, existing BFT assemblies have very tight manufacturing tolerances that complicate assembly and can result in part seizures and/or seal leaks over time due to wear. Accordingly, there remains a need for improved feed-through assemblies, including firewall and bulkhead feed-through (BFT) assemblies. The various embodiments, as described herein and as shown in the figures, include BFT assemblies that allow components or parts to pass through the bulkhead without compromising the integrity of the bulkhead. The various components or parts can include moving parts such as actuators and shafts, as well as static (non-moving) parts such as conduits, cables, and/or pipes. The BFT assemblies accommodate degrees of freedom and movement of the components or parts without compromising functionality. This can be accomplished in some embodiments with convolution structures, which provide flexibility and adaptability to the BFT assembly as described in more detail herein.

Figure 1:
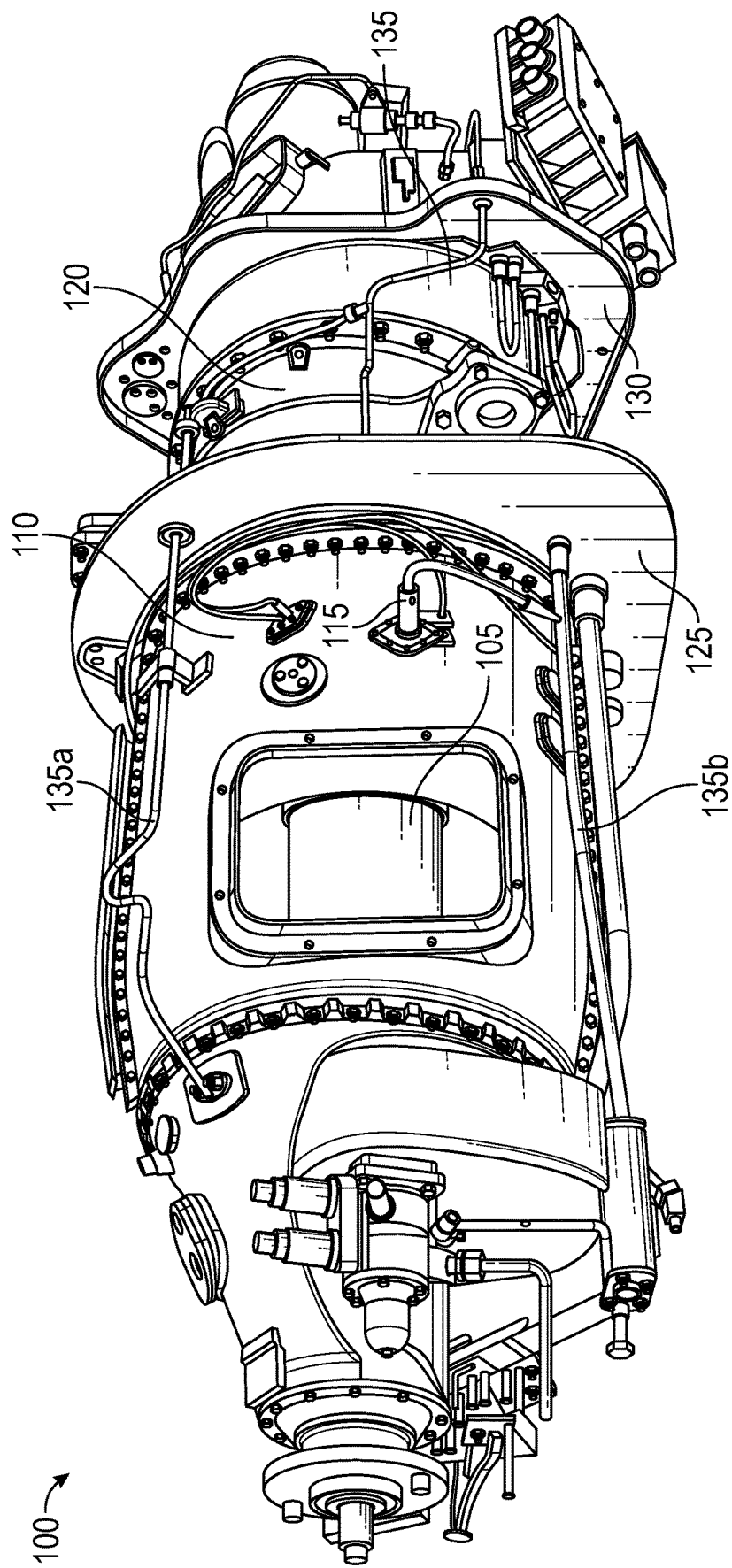
FIG. 1 shows an example of an aeronautical engine, according to an embodiment of the present disclosure.

Referring to FIG. 1, an example of an aeronautical engine 100 is shown, according to an embodiment of the present disclosure. Types of such engines include turboprops, turbofans, turbomachines, and turbojets. The aeronautical engine 100 has multiple high-pressure and/or high-temperature components, including a turbine 105, a combustor 110, a fuel system 115, and a compressor 120. Some or all of these components are located in different sections of the aeronautical engine 100, separated by example bulkheads 125, 130 that serve as fire barriers and partition walls. The aeronautical engine 100 also includes example components 135a and 135b that need to move or to pass through the bulkheads 125, 130 without compromising the integrity of the bulkheads 125, 130. Example components 135a, 135b may include moving parts such as rotating shafts, control rods, and actuators, and may include static (non-moving) conduits such as cables, tubes, pipes, fuel lines, wires, and harnesses.

Figure 2:
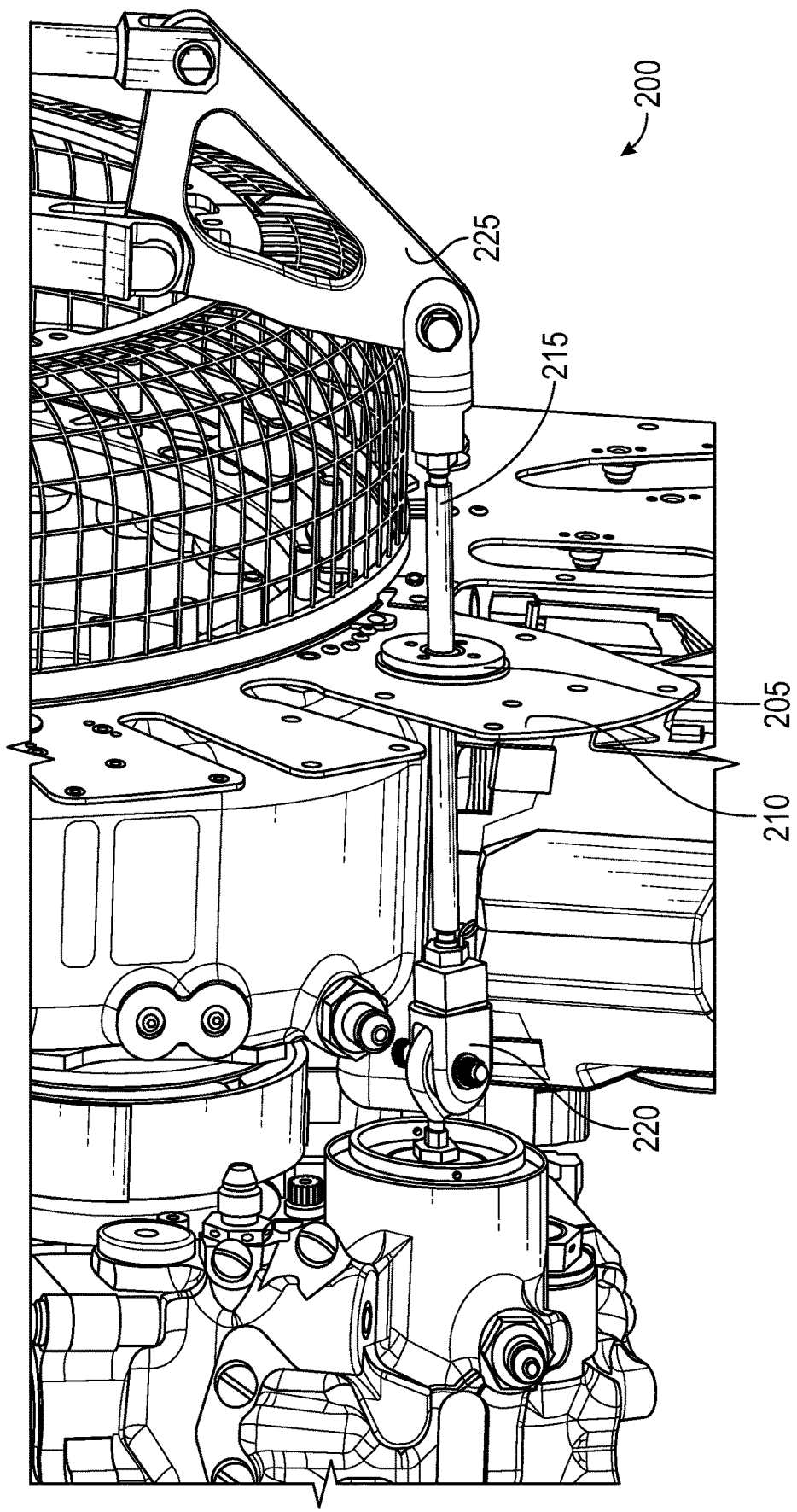
FIG. 2 shows a portion of an engine with a bulkhead feed-through assembly, according to an embodiment of the present disclosure.

An example of a portion of an engine 200 is shown in FIG. 2. This portion of engine 200 includes a bulkhead feed-through 205 of a firewall bulkhead 210. As shown, bulkhead feed-through 205 can include an actuated control rod 215 passing through the firewall bulkhead 210. The actuated control rod 215 connects an actuation point 220 on one side of the firewall bulkhead 210 to a bell crank assembly 225 on the other side. As the bell crank assembly 225 moves, the actuated control rod 215 also slides back and forth. The actuated control rod 215 passes through the bulkhead feed-through 205, which must permit the sliding motion of the actuated control rod as well as any vibrational motion, tilting, and translational motion of the actuated control rod that may occur during operation of the engine 200. In addition to moving shafts (such as the actuated control rod 215), there are numerous static rods and conduits that also pass through various bulkheads. An engine of the type shown in FIG. 1 or 2 may have as many as fifty such feed-throughs for moving and static components. Each of these feed-throughs can be required to meet fire prevention standards and/or requirements. In some instances, in the United States, for example, an aeronautical engine 100 would need to meet 14 CFR fire preventions regulations, per PART 23, PART 25, and PART 33. To address fire prevention, tight manufacturing tolerances are required, to achieve a precise fit and to allow relative motion.

Figure 3B:
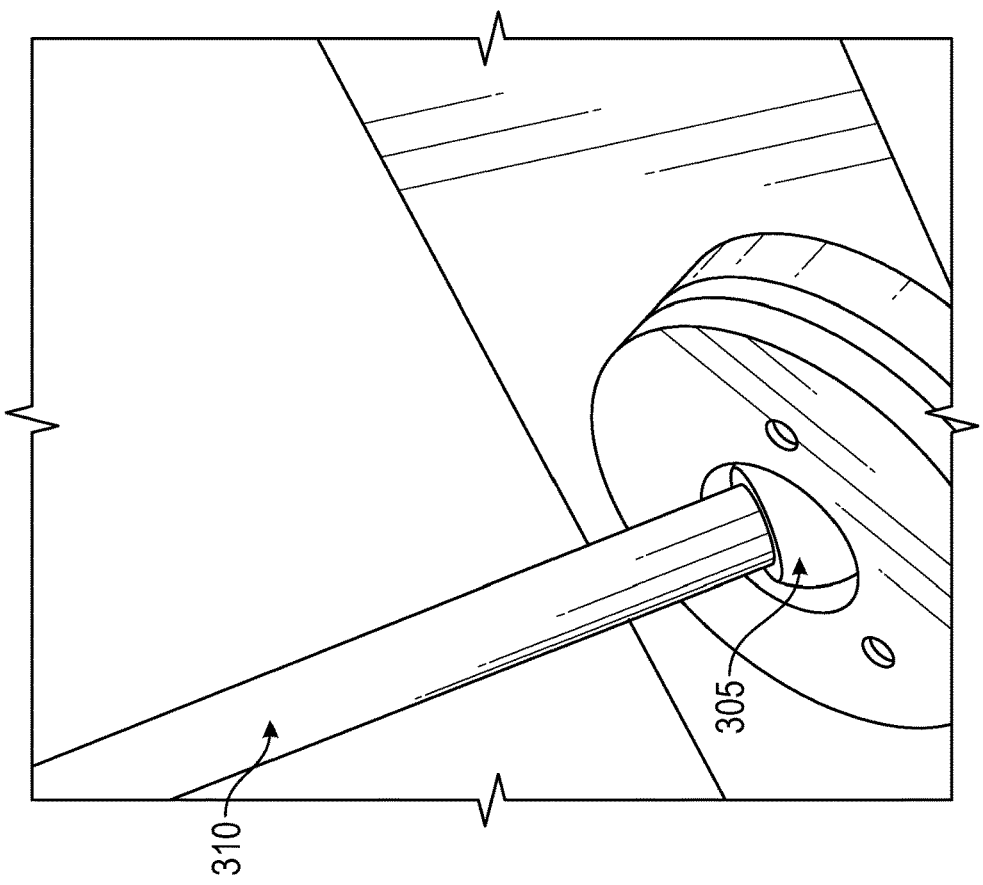
FIG. 3B shows a perspective view of a seized rod passing through a bearing of a prior art feed-through assembly.
Figure 3A:
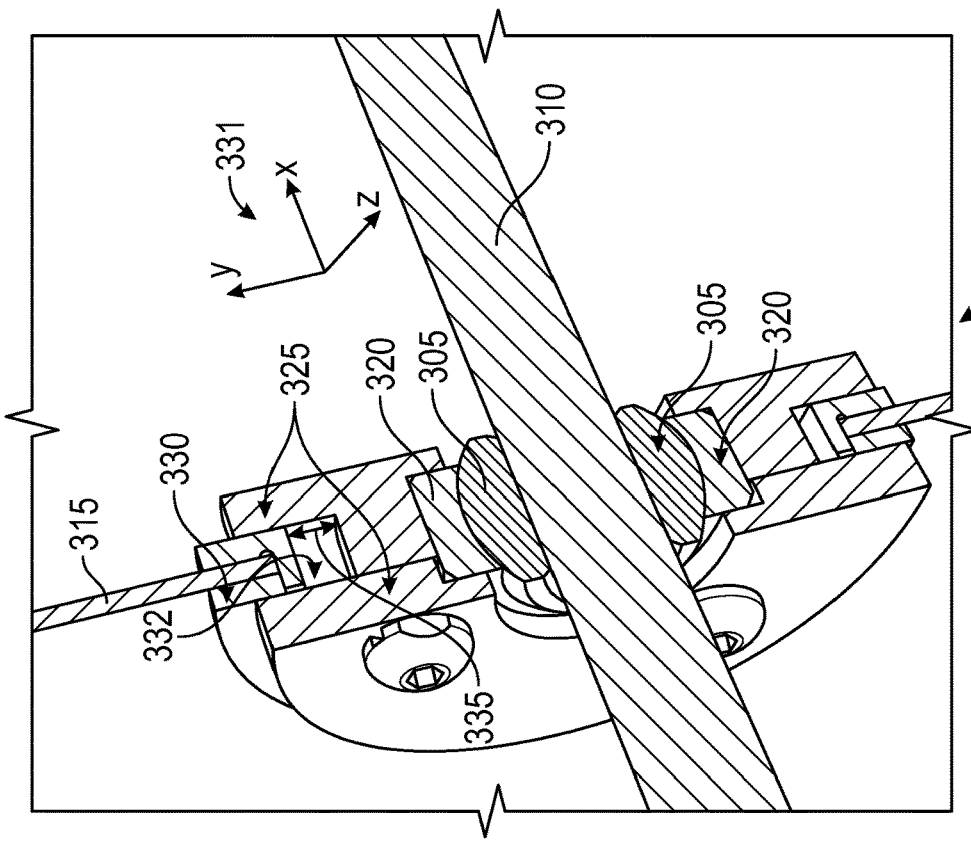
FIG. 3A shows a cross-sectional view of a prior art bulkhead feed-through assembly, with a spherical bearing to accommodate a moving shaft.

In the prior art, for moving conduits like actuation rods, a spherical bearing sliding joint has been used to enable the relative motion and to meet the fire requirement, but suffers from limitations such as seizure. Prior art FIG. 3A shows an example of a bulkhead feed-through (BFT) assembly 300, with a bearing 305 that is solid, rigid, and inflexible, to accommodate a moving shaft 310. The BFT assembly 300 occupies and seals a circular opening in a bulkhead 315. The moving shaft 310 passes through the bearing 305, which is held in place by a race 320 that permits the bearing 305 to rotate in any direction, though the amount of rotation is limited by the shaft 310 and the bulkhead 315. The race 320 is secured to the bulkhead 315 by mounting flanges 325 that overlap both the bulkhead 315 and the race 320 on both sides of each. The mounting flanges 325 are bolted together in direct contact with the race 320, but are not in direct contact with the bulkhead 315. Instead, a sliding cap 330 sits between the mounting flanges 325 and the bulkhead 315. The sliding cap 330 has a U-shaped cross section that overlaps the bulkhead 315 on both sides. The sliding cap 330 is annular in shape, with an inner radius that is greater than an inner radius of a central portion of the mounting flanges 325, which is also annular. This difference leaves a gap 332 in which the BFT assembly 300 (bearing, race, and flanges) can slide as a whole in a transverse direction perpendicular to the bulkhead. As shown by directional arrow 335, during the transverse sliding motion of the BFT assembly 300, mounting flanges 325 can slide over the sliding cap 330 mount connection to the bulkhead 315.

With continued reference to FIG. 3A, the multiple degrees of freedom (DOF) to accommodate the motion of the shaft 310 are discussed. This motion can be described relative to a coordinate system 331 where the X-axis is along the length of the shaft 310, and the Y-Z plane is the plane of the bulkhead 315. In the case of a moving shaft 310 (e.g., an actuator rod such as the one depicted in FIG. 2), the moving shaft 310 moves back and forth along the X-axis (translation along X, "UX"), and/or spins (rotation about X, "ROTX"). In addition, the bearing 305 permits tilting motion of the shaft 310 (rotation about Y, "ROTY", and rotation about Z, "ROTZ," or any combination thereof). Finally, the sliding cap 330 permits motion within the gap 332 along the plane of the bulkhead 315 (translation along Y, "UY", and translation along Z, "UZ," or any combination thereof). Vibrational motions may also occur, which can be a combination of minute amounts of all of the aforementioned degrees of freedom.

A challenge of this prior art assembly is that it requires tight manufacturing tolerances (e.g., on the order of 0.2 millimeters), and a surface finish to achieve the required fit of the shaft 310 within the bearing to permit the motion along the degrees of freedom described above. Failure to meet these manufacturing tolerances, as well as misalignment or other variations during installation procedures of the BFT assembly 300, during motion, the shaft 310 may get stuck inside the bearing 305, or the sliding cap 330 may get similarly stuck inside the mounting flanges 325. Surface contamination of the sliding parts may also lead to seizure during operation of the engine in the field. An example of seizure of the shaft 310 within the bearing 305 is shown in FIG. 3B. Other possible modes of failure include seizure of the bearing 305 within the race 320, and seizure of the sliding cap 330 within the flanges 325.

Figure 4B:
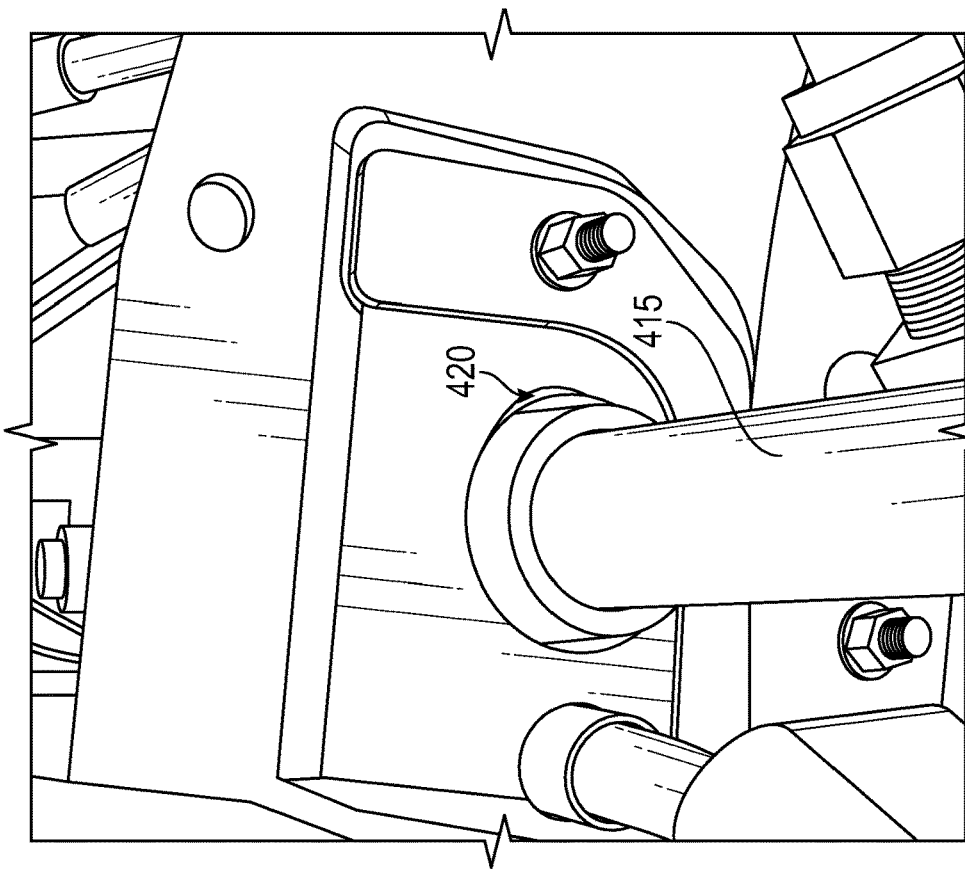
FIG. 4B shows an opening in a prior art bulkhead feed-through assembly, permitting a pathway for fire to cross the bulkhead.
Figure 4A:
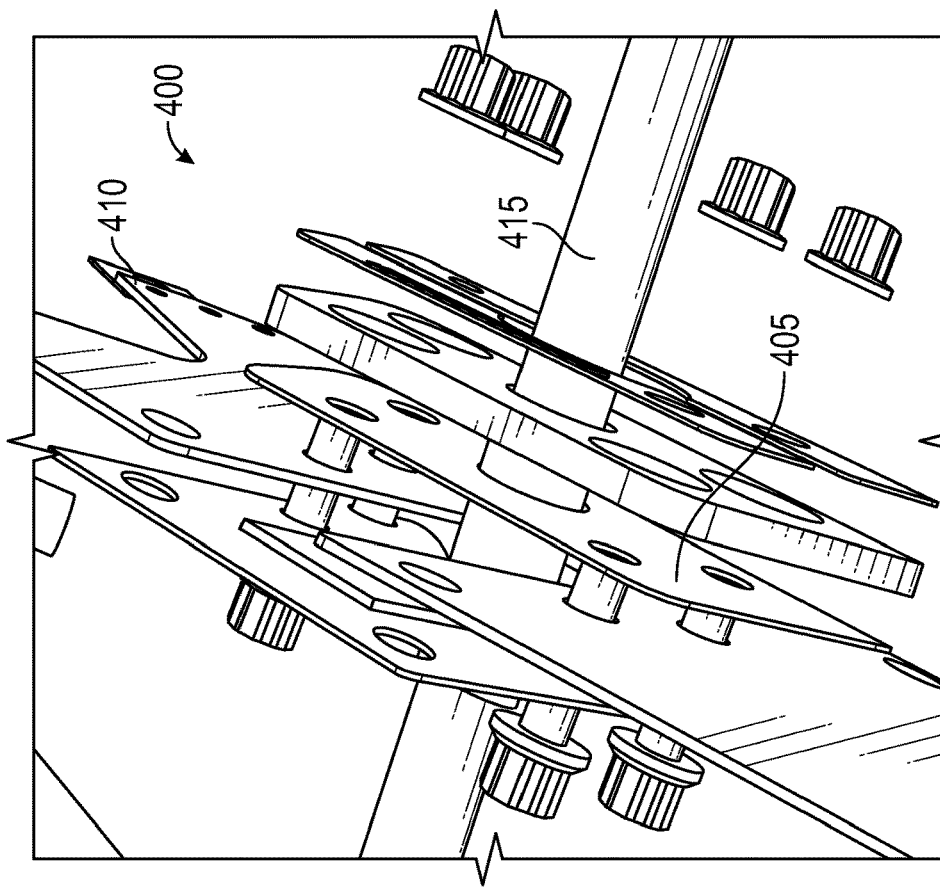
FIG. 4A shows an exploded view of a prior art bulkhead feed-through assembly, with overlapping seals to accommodate a static conduit.

Referring now to prior art FIG. 4A, an exploded view of a bulkhead feed-through (BFT) assembly 400 is shown. The BFT assembly 400 is shown with overlapping seals 405 and retainer plates 410 to accommodate a static conduit 415.

Despite there being no intended motion of the static conduit 415, multiple overlapping seals 405 and retainer plates 410 are required to meet fire safety standards. One limitation of the BFT assembly 400 is that the overlapping seals 405 and retainer plates 410 add weight. Another is that manufacturing tolerances and assembly variation may lead to misalignment, resulting in a pathway opening 420 through which fire can penetrate, as shown in FIG. 4B.

These problems, among others, of the prior art can be overcome by the various embodiments. The BFT assembly may be configured to include flexible elements (e.g., convolution sections) that are adaptive to motion and/or movement relating to a BFT. These embodiments and configurations simplify the assembly, reliably accommodate tight manufacturing tolerances, and can reliably compensate in use and/or due to wear.

Further, these embodiments and configurations can simplify the BFT assembly by reducing the number of components, have fewer moving parts, and have less weight and volume. These embodiments can have an adaptive configuration that allows for and/or permits motion along all any and/or all of the required degrees of freedom (i.e., ROTX, ROTY, ROTZ, UX, UY, and UZ). For example, various embodiments allow for and/or permit motion without the sliding body/moving part seizures or fire path openings as described in the prior art, as described above with reference to FIGS. 3A, 3B, 4A, and 4B.

Examples of electroformed bulkhead feed-through assemblies using flexible convolution sections to facilitate motion and to preserve fire barrier integrity are now described. Other embodiments are also apparent, such as embodiments that are not manufactured using electroforming, and embodiments with more or fewer convolution sections than as described below. Various components or parts, referred to above as components 135a, 135b, can pass through the bulkhead feed-through assemblies. The embodiments can be applicable to bulkhead feed-throughs for moving shafts such as rotating shafts, control rods, and actuators, as well as for static (non-moving) conduits such as cables, tubes, pipes, fuel lines, wires, and harnesses. Although the term "shaft" may be used in the description and with reference to the figures, that term "shaft" can be understood to include any and all types of moving shafts and static conduits that would be used with a bulkhead feed-through assembly.

Figure 5A:
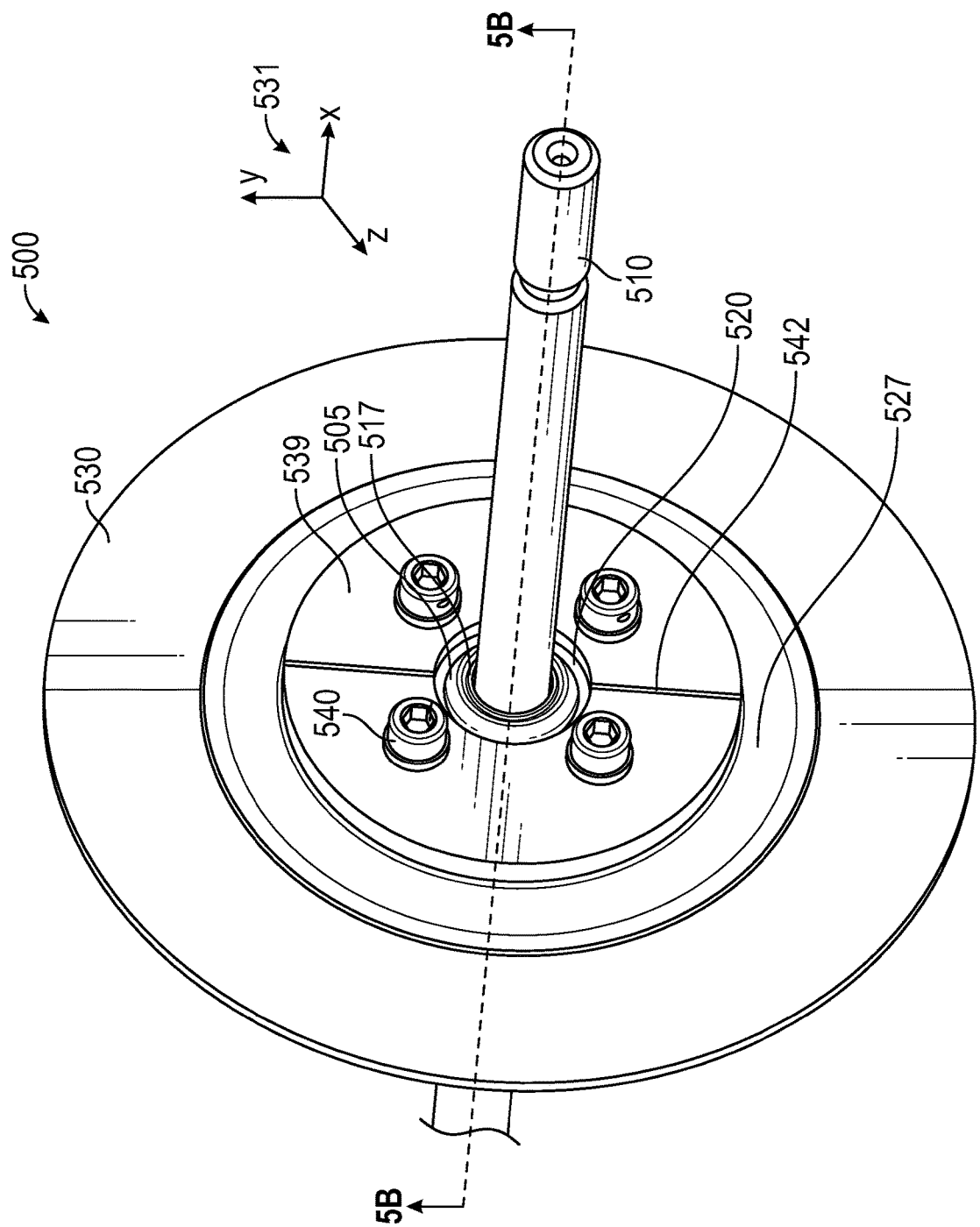
FIG. 5A shows a perspective view of a bulkhead feed-through assembly including a spherical element with a convolution section, according to an embodiment of the present disclosure.
Figure 5B:
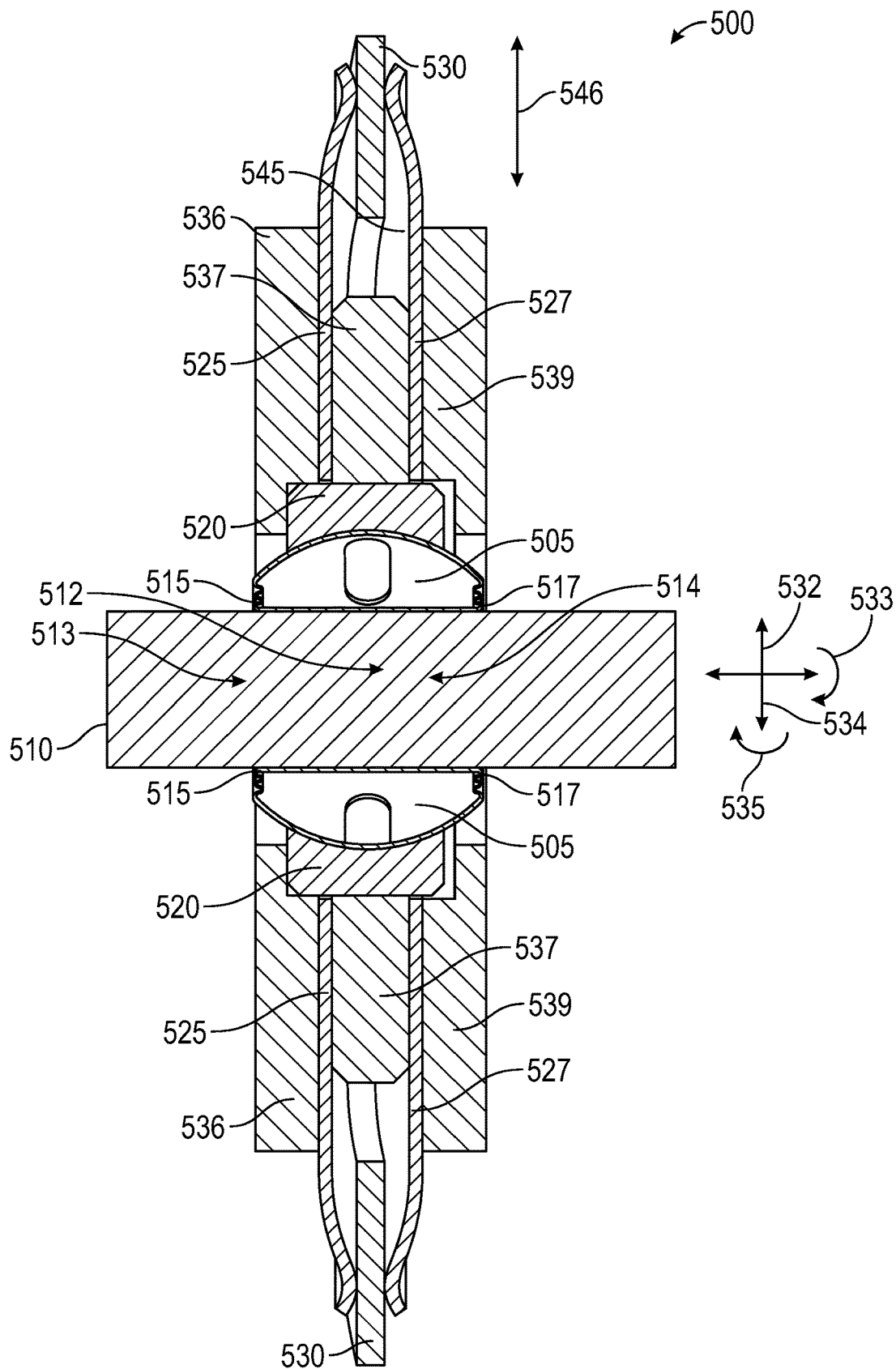
FIG. 5B shows a cross-sectional view taken along line 5B-5B of the bulkhead feed-through shown in FIG. 5A.

Referring now to FIG. 5A, a perspective view of a bulkhead feed-through (BFT) assembly 500 is shown, according to some embodiments. The BFT assembly 500 generally includes spherical element 505 to receive a shaft 510, a channel 512, convolution sections 515, 517, a race 520, and flexible spring elements 525, 527 (the channel 512, convolution section 515, and flexible spring element 527 are not shown in FIG. 5A). The BFT assembly 500 is mounted or installed to a bulkhead 530 to permit the shaft 510 to pass through. A cross-sectional view of the BFT assembly 500 is shown in FIG. 5B, taken along line 5B-5B, in which all of these elements are shown. This motion of the shaft 510 can be described relative to a coordinate system 531 where the X-axis is along the length of the shaft 510, and the Y-Z plane is the plane of the bulkhead 530.

The spherical element 505 can include the channel 512 and the convolution sections 515, 517. The channel 512 can be oriented along the diameter of the spherical element 505, and the remainder of the spherical element 505 can be hollow, instead of solid. The shaft 510 is received by the channel 512 through openings at both ends 513, 514. The channel 512 is in contact with the circumference of the shaft 510 along the full length of the shaft 510. The shaft 510 can be move-able into and out of the channel 512 (e.g., UX, as indicated by arrow 532). The shaft 510 can rotate within the channel 512 (e.g., ROTX, as indicated by curved arrow 533). The channel 512 extends through the spherical element 505 and is surrounded by a hollow space disposed between a wall of the channel 512 and an external wall that defines the outer surface of the spherical element 505, as discussed in more detail with reference to FIGS. 6A, 6B, and 6C below.

The two convolution sections 515, 517 surround the openings at both ends 513, 514 of the channel 512. The convolution sections 515, 517, which are described in more detail with reference to FIGS. 7A, 7B, and 7C, can be configured to be flexible, resilient, expandable and/or compressible, resulting from at least their thickness, profile shape, and material. The convolution sections 515, 517 act as a compression spring, oriented perpendicular to the channel 512. The convolution sections 515, 517 can have a natural (uncompressed) state that results in the channel 512 having a smaller diameter than a diameter of the shaft 510 meant to pass through. As a result, the convolution sections 515, 517 can be installed onto the shaft 510, preferably, in a partially compressed state. The compressed state of the convolution sections 515, 517 can create a close seal and grip around the shaft 510 due to a constant force exerted by the convolution sections 515, 517 as one or both attempt to expand to their natural uncompressed state. This constant force couples the wall of the channel 512 of the spherical element 505 to the shaft 510. The coupling can prevent openings, gaps, or separations between the shaft 510 and the spherical element 505 during motion of the shaft 510 that could allow a path across the bulkhead 530, such as an unintended path that may cause fire, for example, to cross the bulkhead 530. Due to their flexibility and resilience, the convolution sections 515, 517 adapt to assembly variation and provide additional degrees of freedom for motion of the shaft 510 (e.g., UX, UY, UZ, ROTX, ROTY, ROTZ, and combinations thereof).

For example, deflection of the shaft 510 (e.g., UY, UZ, and any combination thereof, as indicated by arrow 534) is facilitated by (1) further compression of both convolution sections 515, 517 on the side of the shaft 510 towards the direction of deflection, and (2) simultaneous and corresponding expansion of both convolution sections 515, 517 on the opposite side of the shaft 510 away from the direction of deflection.

As another example, tilting of the shaft 510 (e.g., ROTY, ROTZ, and any combination thereof, as indicated by curved arrow 535) is facilitated by (1) further compression of a portion of the convolution section 515 at one end of the channel on the side of the shaft 510 towards the direction of the tilting motion, (2) expansion of a portion of the convolution section 515 at that end of the channel 512 on the side of the shaft 510 opposite to the direction of the tilting motion, (3) expansion of a portion of the other convolution section 517 at the other end of the channel on the side of the shaft 510 towards the direction of the tilting motion, and (4) further compression of a portion of the other convolution section 517 at the other end of the channel 512 on the side of the shaft 510 opposite to the direction of the tilting motion.

The spherical element 505 is situated within a race 520 that permits spherical element 505 to rotate freely in any direction, providing additional rotational degrees of freedom (e.g., ROTX, ROTY, ROTZ, and any combination thereof). The BFT assembly 500 further includes two flexible spring elements 525, 527 that have an annular shape and that are configured to be positioned to surround the race 520. As shown in FIG. 5B, flexible spring elements 525, 527 are positioned to oppose each other. The flexible spring elements 525, 527 are narrower around the perimeter, and are positioned on either side of the bulkhead 530. The distance between the flexible spring elements 525, 527 is, therefore, wider than the width of the bulkhead 530, except for at the perimeter, where the narrowing results in a distance that is slightly less than the bulkhead 530 width. The flexible spring elements 525, 527 are installed in a compressed state so that they exert pressure on the bulkhead 530. As shown, the bulkhead 530 is gripped on either side by the flexible spring elements 525, 527, by a compressive force exerted upon the bulkhead 530 by their narrower perimeter.

The flexible spring elements 525, 527 overlap the bulkhead 530 on each side, and can be disposed between flanges 536, 537, 539. The overlapping layers of flexible spring elements 525, 527 and flanges 536, 537, 539 can be bolted together with bolts 540 to hold them together. The flanges 536, 537, 539 can be configured to cooperate with the race 520. As shown, the race 520 can be positioned in an annular recess in the flanges 536, 537, 539.

In some embodiments, as shown in FIG. 5A, the flanges 536, 537, 539 can be configured as semicircular plates extending one hundred eighty degrees annularly. With semicircular plates, the halves overlap at a split junction 542 to ensure fire resistance and a torturous path for flames. This configuration facilitates installation of the BFT assembly 500 onto the bulkhead 530, in some embodiments.

The radius of the flange 537 (between the flexible spring elements 525, 527 in this embodiment) can be less than the radius of the opening in the bulkhead 530, leaving a gap 545 that permits sliding motion of the bulkhead feed-through assembly 500, as a whole, perpendicular to the bulkhead 530. This sliding motion, as indicated by arrow 546, provides additional translational degrees of freedom (e.g., UY, UZ, and any combination thereof). This motion has a maximum range equal to the size of the gap 545 between the flange 537 and the bulkhead 530.

In addition to the degrees of freedom UX, UY, UZ, ROTX, ROTY, and ROTZ, the convolution sections 515, 517 and the flexible spring elements 525, 527 also allow vibrational motions of the shaft 510 and the BFT assembly 500 as a whole. These vibrational motions can be a combination of minute amounts of all of the aforementioned degrees of freedom.

Figure 6A:
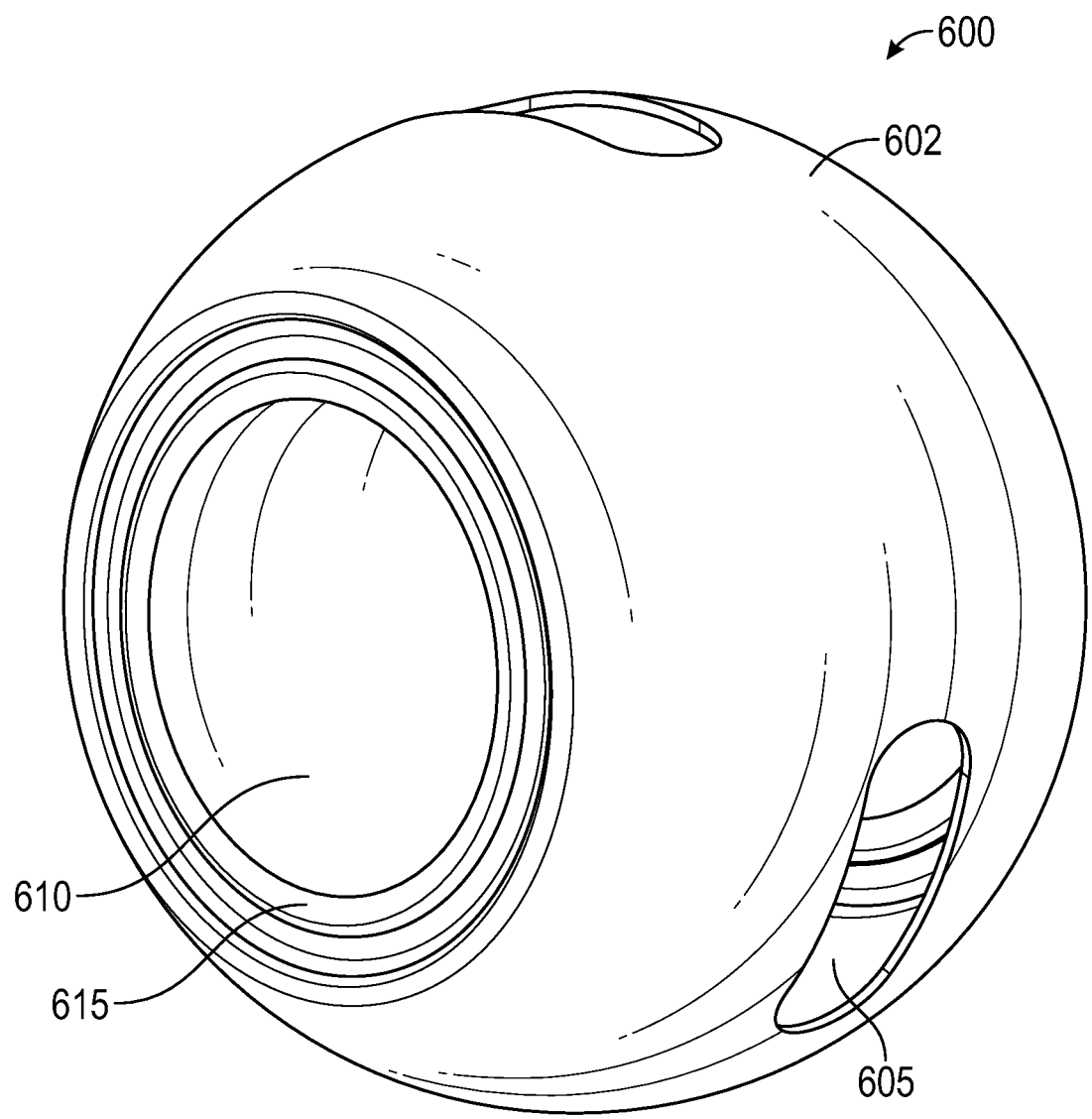
FIG. 6A shows a perspective view of a spherical element, according to an embodiment of the present disclosure.

Referring now to FIG. 6A, a perspective view of a spherical element 600 is shown, according to an embodiment of the present disclosure. Spherical element 600 can be included in a bulkhead feed-through assembly similar to that previously shown and described with respect to BFT assembly 500 and spherical element 505.

The spherical element 600 has a spherical outer shell 602. In embodiments in which the spherical element 600 is manufactured using an electroforming process, one or more slots 605 in the spherical outer shell 602 function as a passage to dissolve out the expendable mandrel during manufacture, with cutout shapes designed for the added benefit of reducing weight without sacrificing strength or integrity.

The spherical outer shell 602 also has a channel 610 that receives a shaft, such as the shaft 510 described above with reference to FIGS. 5A and 5B. This channel 610 is similar to the channel 512 shown and described above with reference to FIG. 5B, and runs the full diameter of the spherical element 600.

Figure 6B:
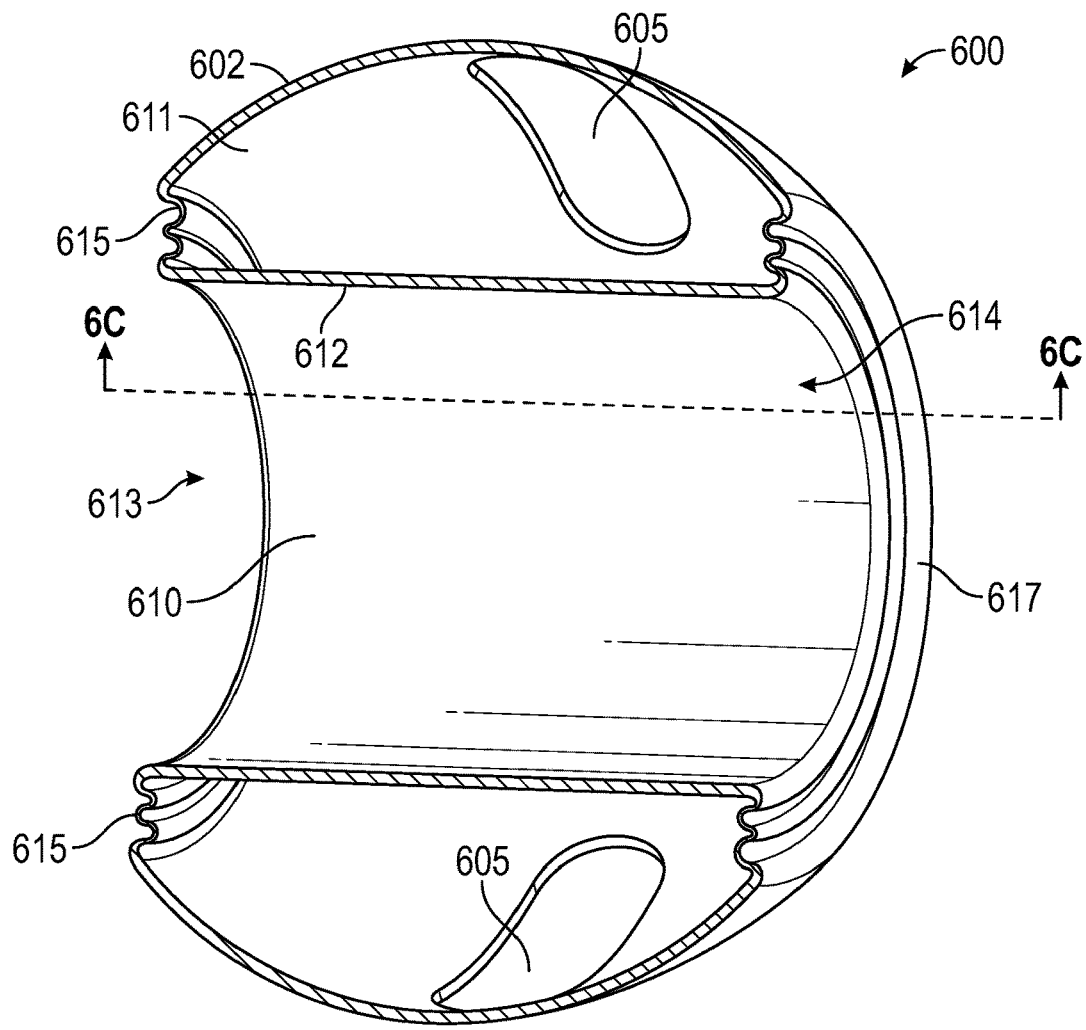
FIG. 6B shows a perspective cut-away view of the spherical element of FIG. 6A.

FIG. 6B shows a cut-away view of the spherical element 600 shown in FIG. 6A. The cut-away view shows a hollow space 611 between the spherical outer shell 602 and an inner surface 612 of the channel 610. The hollow space 611 can extend annularly about the channel 610. The hollow space can be defined by the inner surface 612 of the channel 610, the spherical outer shell 602, and the convolution sections 615, 617. The cut-away view also shows that circular ends 613, 614 of the channel 610 are each surrounded circumferentially by convolution sections 615, 617.

Figure 6C:
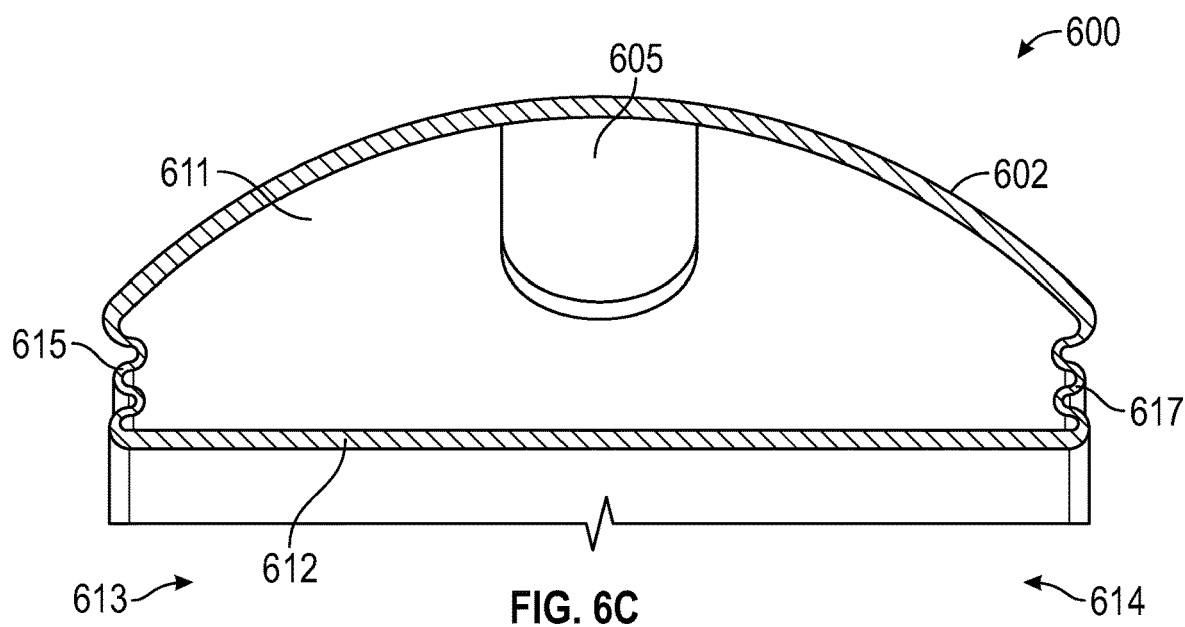
FIG. 6C shows a cross-sectional view taken along line 6C-6C of the spherical element shown in FIG. 6A.

FIG. 6C shows a cross-sectional taken along line 6C-6C in FIG. 6B. The slots 605 in the spherical outer shell 602 open into the hollow space 611. The convolution sections 615, 617 are disposed between the spherical outer shell 602 and the inner surface 612 of the channel 610. In some embodiments, the material thickness of the convolution sections 615, 617 is thinner than the spherical outer shell 602 and/or the inner surface 612 of the channel 610. Some embodiments of the convolution sections 615, 617 are described in more detail with reference to FIGS. 7A, 7B, and 7C.

The convolution sections 615, 617 are flexible and are installed in a compressed state about the shaft (not shown). Any surface contamination or opening due to wear at sliding surface between the convolution sections 615, 617 and a shaft in the channel 610 is compensated by recovery from the compressed state of the convolution sections 615, 617, which remain in-contact with the shaft at all times during translation and rotation motion (e.g., UX and ROTX). The compressed state of the convolution sections 615, 617 can also serve to press the spherical element 600 in contact against a surrounding race (not shown) similar to the race 520 described and shown above in FIG. 5B, to further prevent any openings in the bulkhead feed-through assembly during rotation of the spherical element 600 (e.g., ROTX, ROTY, ROTZ, and combinations thereof).

Example parameters for the feed-through assembly may include profile shape, thickness of the convolution sections 615, 617, and number of convolution sections 615, 617. Each of these parameters affects the flexibility of the convolution sections 615, 617, and/or the overall range of motion permitted by a BFT assembly 500 as a whole.

Figure 7A:
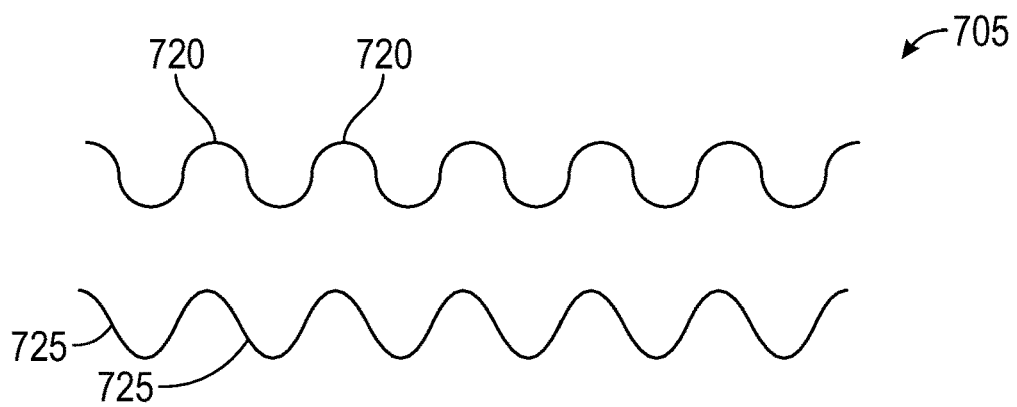
FIG. 7A shows a wave profile of a convolution section, according to an embodiment of the present disclosure.
Figure 7B:
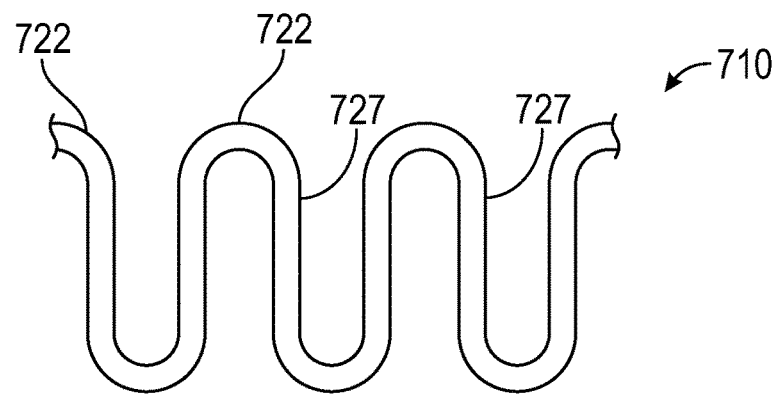
FIG. 7B shows a corrugated U-shaped profile of a convolution section, according to an embodiment of the present disclosure.
Figure 7C:
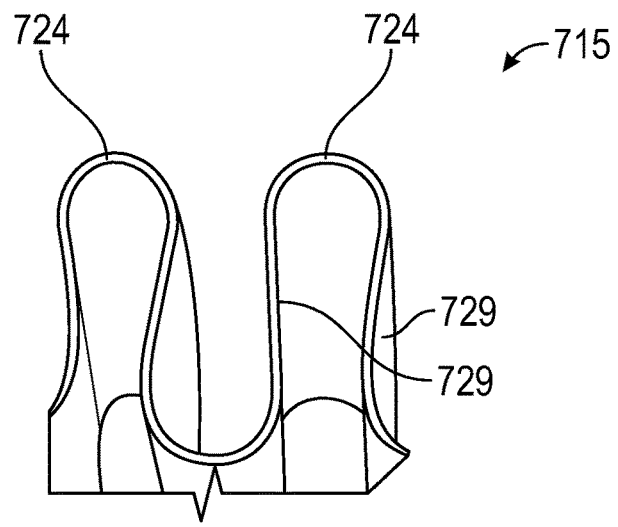
FIG. 7C shows a corrugated omega-shaped profile of a convolution section, according to an embodiment of the present disclosure.

The convolution sections 615, 617 can include various configurations and shapes. In one aspect, with respect to profile shape, the convolution sections 615, 617 can have a periodic profile shape in some embodiments. An example periodic profile shape is a wave-shaped profile 705 as shown in FIG. 7A. Alternatively, in other aspects, the convolution sections 615, 617 may have different shape profiles, including a corrugated U-shaped profile 710 as shown in FIG. 7B, and a corrugated omega-shaped profile 715, as shown in FIG. 7C. Other possible profiles are contemplated, including triangles and accordion-style bellows (not shown).

In the examples shown in FIGS. 7A, 7B, and 7C, each profile can have flexible portions (e.g., curved sections 720, 722, 724) where the material bends during compression and expansion. Compression of the convolution sections 615, 617 decreases the radius of curvature of these curved sections 720, 722, 724, for example, and expansion increases this radius. Each profile can also have inflexible portions (e.g., straight sections 725, 727, 729) where the material moves intact during compression and expansion. For example, compression of the convolution moves these straight sections 725, 727, 729 closer together, and expansion moves them apart. The profile shape can be configured to determine the range of these motions. For example, an embodiment with a wave profile 705 can have a greater compressibility relative to an embodiment with the corrugated U-shaped profile 710, and an embodiment with the corrugated omega-shaped profile 715 can have less compressibility relative to the corrugated U-shaped profile.

For any given profile, the number of each type of section (flexible or inflexible) can also determine the range of motion. Increasing the number of curved sections 720, 722, 724, for example, increases the maximum angle of tilt possible, but at the expense of potentially reducing the amount of deflection, since the curved sections 720, 722, 724, can have a minimum radius beyond which they cannot be further compressed.

With respect to thickness, in some embodiments, the convolution sections 615, 617 can have a different thickness than other portions of the feed-through assembly, such as the spherical outer shell 602 of the spherical element 600 and/or the inner surface 612 of the channel 610. The convolution sections 615, 617 in some embodiments have a thickness between ten millimeters (mm) and sixty mm, for example. A greater thickness leads to greater stiffness, which results in less compressibility, and a thinner thickness leads to lesser stiffness, which results in greater compressibility.

As noted above, the BFT assembly 500 depicted in FIGS. 5A and 5B uses a single pair of convolution sections 515, 517 at both ends 513, 514 of the channel 512 for the shaft 510, with a spherical element 505. The pair of convolution sections 515, 517 provides both translational and rotational degrees of freedom, and the spherical element 505 provides additional rotational degrees of freedom. Additional convolution sections can be added in some embodiments, to the extent that the spherical element 505 is no longer necessary.

Figure 8A:
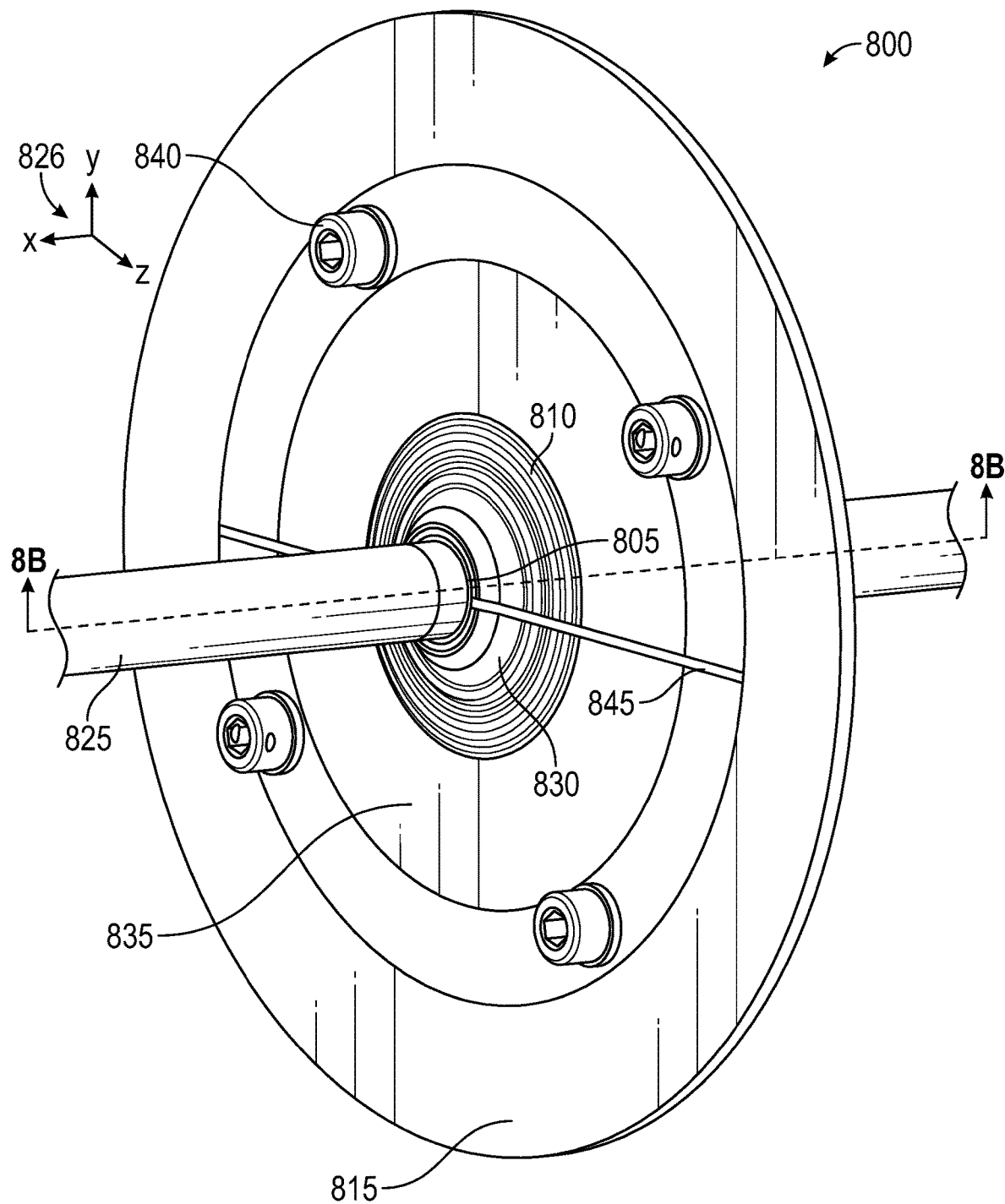
FIG. 8A shows a perspective view of a bulkhead feed-through assembly, according to another embodiment of the present disclosure.

Referring now to FIG. 8A, a perspective view of a bulkhead feed-through (BFT) assembly 800 with two pairs of convolution sections 805, 807, 810, 812 is shown, according to an embodiment of the present disclosure. Convolution sections 805 and 810 are on one side of a bulkhead 815, and convolution sections 807, 812 are on the opposite side of the bulkhead 815. Though convolution sections 807, 812 are obscured by the perspective view in FIG. 8A, all four convolution sections 805, 807, 810, 812 are visible on both sides of the bulkhead 815 in the cross-sectional view of FIG. 8B taken along line 8B-8B in FIG. 8A.

The bulkhead feed-through assembly 800 has a channel 820 to receive a shaft 825 shaft (such as the shaft 510 described above with reference to FIGS. 5A and 5B).

The BFT assembly 800 is mounted or installed to the bulkhead 815 to permit the shaft 825 to pass through. This motion of the shaft 825 can be described relative to a coordinate system 826 where the X-axis is along the length of the shaft 825, and the Y-Z plane is the plane of the bulkhead 815.

The channel 820 receives the shaft 825 through an opening at each of the ends 828, 829. The channel 820 is similar to the channels 512 and 610 shown and described above with reference to FIGS. 5B, 6A, 6B, and 6C. A channel wall 827 is in contact with the circumference of the shaft 825 along its length. The shaft 825 can be move-able into and out of the channel 820 (e.g., UX) as well as rotate-able within the channel 820 (e.g., ROTX).

Figure 8B:
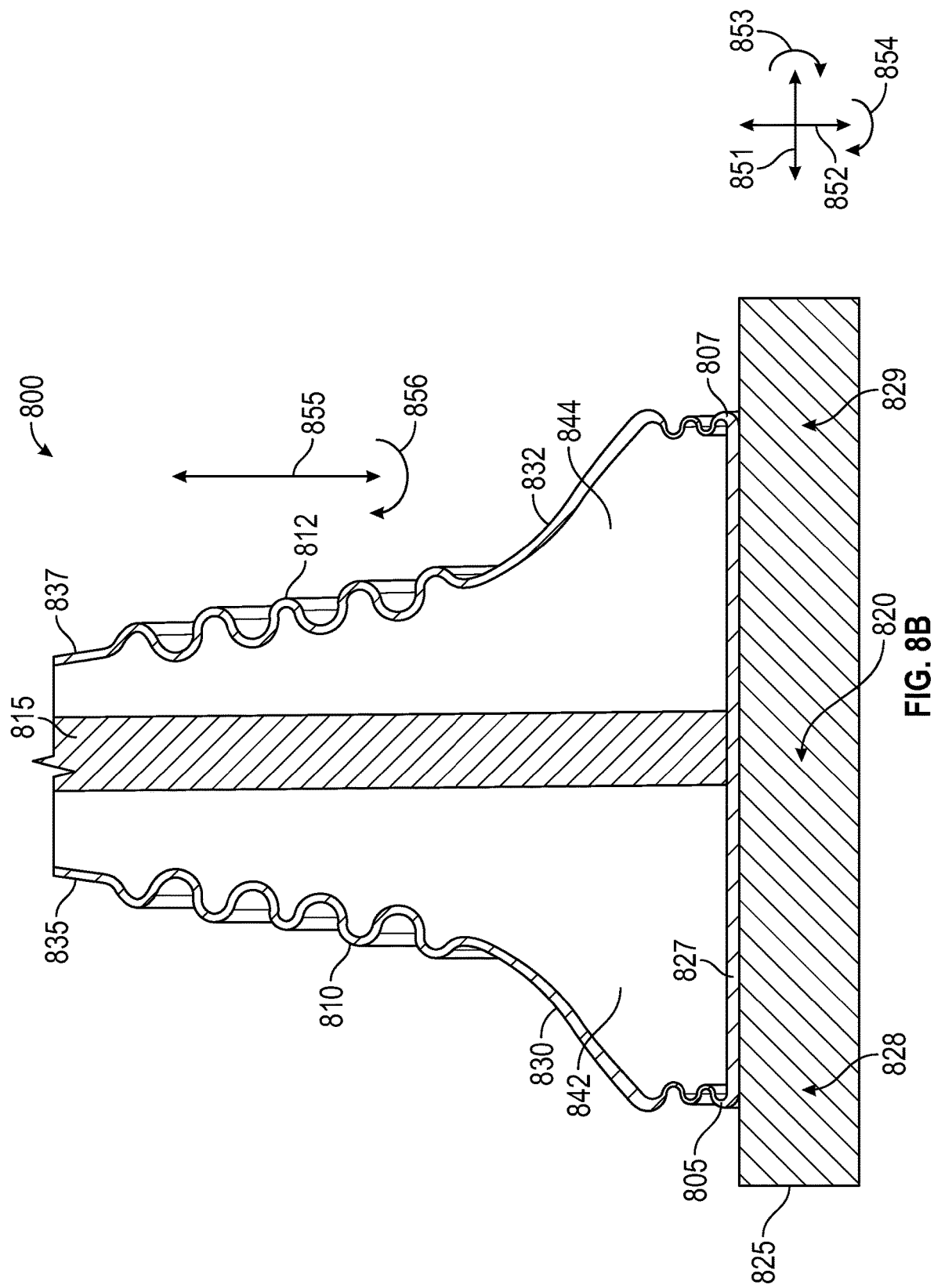
FIG. 8B shows a cross-sectional view taken along line 8B-8B of the bulkhead feed-through shown in FIG. 8A.

FIG. 8B shows a cross-sectional view of the BFT assembly 800 in which the ends 828, 829 of the channel 820 are each surrounded circumferentially by the convolution sections 805, 807, respectively. The BFT assembly 800 also has shrouds 830 and 832 on both sides of the bulkhead 815. The convolution sections 805 and 807 are disposed between the channel wall 827 and the shrouds 830 and 832. The shroud 830 is disposed between convolution section 805 and convolution section 810 on one side of the bulkhead 815. Likewise, the shroud 832 is disposed between convolution section 807 and convolution section 812 on the other side of the bulkhead 815.

Beyond the convolution sections 810 and 812, the bulkhead feed-through assembly 800 has sleeves 835 and 837 that extend further out along the bulkhead 815. The sleeves 835 and 837 are bolted to each other through the bulkhead 815 by several bolts 840, which keep the BFT assembly 800 in place. When the BFT assembly 800 is secured in place to the bulkhead 815 by the bolts 840, such that the channel wall 827 is in contact with the shaft 825 along its length, there is no gap between the bulkhead 815 and the channel wall 827. When secured in place, the interior volume of the BFT assembly 800 is divided into two hollow sections 842 and 844, on either side of the bulkhead.

In some embodiments, the BFT assembly 800 can be a unitary construction. In some embodiments, as shown in FIG. 8A, the convolution sections 805, 807, 810, 812, shrouds 830 and 832, and sleeves 835 and 837 can be configured to be semicircular halves extending one hundred eighty degrees annularly. The semicircular halves overlap at the split junction 845 to ensure fire resistance and a torturous path for flames. This configuration facilitates installation of the BFT assembly 800 onto the bulkhead 815, in some embodiments.

The first pair of convolution sections 805, 807 at the ends of the channel 820 provide a full set of rotational and translational degrees of freedom for the shaft 825. These degrees of freedom include sliding along UX as indicated by arrow 851, transverse deflection along UY and UZ as indicated by arrow 852, axial rotation ROTX as indicated by curved arrow 853, tilting ROTY and ROTZ as indicated by curved arrow 854, and combinations thereof.

The second pair of convolution sections 810, 812 provides an additional set of rotational and translational degrees of freedom for the shaft 825. These degrees of freedom include transverse deflection UY and UZ as indicated by arrow 855, tilting ROTY and ROTZ as indicated by curved arrow 856, and combinations thereof, which are separate and independent from the degrees of freedom afforded by the first pair of convolution sections 805, 807.

In addition to the degrees of freedom UX, UY, UZ, ROTX, ROTY, and ROTZ, the convolution sections 805, 807, 810, 812 also allow vibrational motions of the shaft 825 and the BFT assembly 800 as a whole. These vibrational motions can be a combination of minute amounts of all of the aforementioned degrees of freedom.

In some embodiments, the second pair of convolution sections 810, 812 has a higher stiffness than that of the first pair of convolution sections 805, 807, abutting the channel 820. This higher stiffness can be achieved by having different profile shape, number of convolutes, thickness, or combination thereof relative to the first pair of convolution sections 805, 807. The range of motion thus provided may be less or more than the range from the first pair of convolution sections 805, 807 adjacent to the channel 820, depending on their relative stiffness and length.

In some embodiments, convolution sections 805, 807 are not an identical pair but have different thickness, number of convolutes, and/or profile shape relative to each other. In some embodiments, convolution sections 810, 812 are not an identical pair but have different thickness, number of convolutes, and/or profile shape relative to each other. In some embodiments, therefore, any two or more of the convolution sections 805, 807, 810, and 812 may be different from each other.

In the example of FIG. 8B, the first pair of convolution sections 805, 807 has three convolutes and the second pair of convolution sections 810, 812 has five convolutes, with the second pair of convolution sections 810, 812 having a greater thickness than the first pair of convolution sections 805, 807. As a result, the range of tilt motion from the second pair of convolution sections 810, 812 will be greater, since there are more curved sections to compress and to expand. However, the tilt motion will bottom out on the first pair of convolution sections 805, 807 adjacent to the shaft 825, before the second pair of convolution sections 810, 812 is engaged to allow an additional range of tilt. This example shows that in some embodiments, the additional range of motion provided by the second pair of convolution sections 810, 812 is an extension of the range provided from the first pair of convolution sections 805, 807. If even greater range is required, then embodiments with three or more pairs of convolution sections could be used, with varying thicknesses, profile shapes, and number of convolutes as needed to attain the desired range of motion and stiffness. In various embodiments, additional pairs of convolution sections could be located between the first two pairs (e.g., in the shrouds 830, 832), outside both pairs (e.g., in the sleeves 835, 837), or any combination of both. Moreover, there may be multiple shrouds and/or sleeves in between pairs of convolutions in some embodiments.

As shown in FIG. 8B, both pairs of convolution sections 805, 807 and 810, 812 have a U-shaped profile 710, the first pair of convolutions (adjacent to the channel) has an optimal thickness of twenty mm, and the second pair an optimal thickness of fifty mm.

The advantages of BFT assembly 800 relative to the prior art or some embodiments such as the BFT assembly 500 described above are that there are no additional components such as flanges, races, sliding caps, spring elements, etc. As a comparison, for the prior art bulkhead feed-through assembly 300 depicted in FIG. 3A, the total volume of the BFT assembly 300 can be approximately 0.5 cubic inches, and weighs about 0.15 pounds. A bulkhead feed-through assembly 800 as described with reference to FIGS. 8A and 8B can have a volume of approximately 0.1 cubic inches, and weigh 0.3 pounds, representing an advantageous savings of size and weight, while also providing improved reliability and fire protection. Some embodiments can be up to five times lighter and have a lower cost, due to reduction in parts, relaxed manufacturing tolerances, and a simplified mechanism in comparison to the prior art design.

Some embodiments may also employ a protective wear coating on some or all of the sliding surfaces of the feed-through assembly. Examples of dry film lubricants that can be used include polytetrafluoroethylene (PTFE), graphite, and molybdenum disulfide. For example, FIG. 9 shows a BFT assembly 900 that is similar to the BFT assembly 800 described above with reference to FIGS. 8A and 8B. A dry film lubricant 905 is applied to an interior surface 910 of a channel 915 of BFT assembly 900, according to an embodiment of the present disclosure.

Figure 10A:
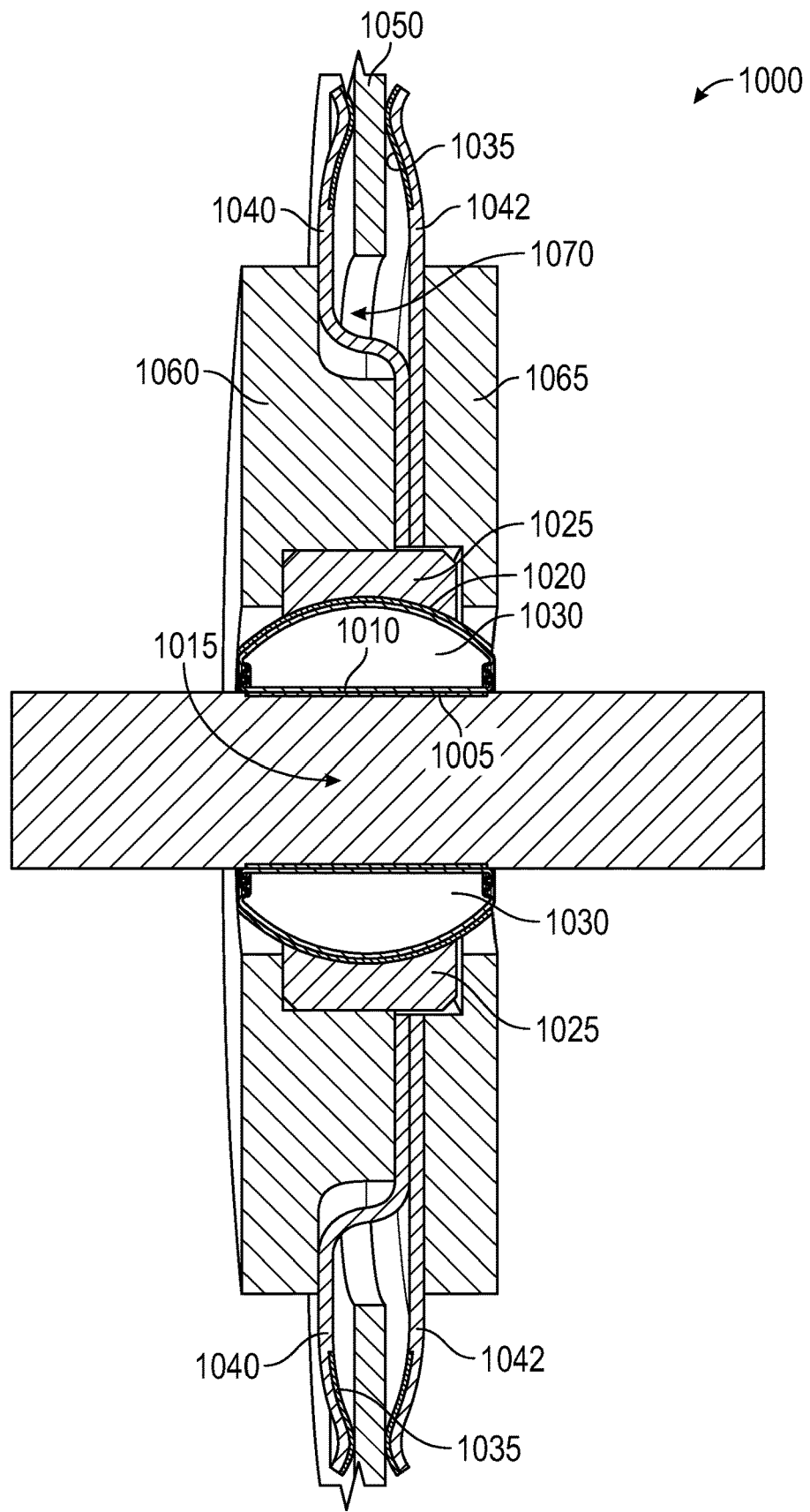
FIG. 10A shows a cross-sectional view of a bulkhead feed-through assembly taken along line 5B-5B of the bulkhead feed-through shown in FIG. 5A, according to another embodiment of the present disclosure.

As another example, FIG. 10A shows a BFT assembly 1000 that is similar to the BFT assembly 500 described above with reference to FIGS. 5A and 5B. A dry film lubricant 1005 is applied to an interior surface 1010 of a channel 1015 of BFT assembly 1000, a second dry film lubricant 1020 between a race 1025 and a spherical element 1030, and a third dry film lubricant 1035 between a pair of flexible spring elements 1040, 1042 and the bulkhead 1050, according to another embodiment of the present disclosure. Any combination of the dry film lubricants 1005, 1020, 1035 may be used, and these dry film lubricants 1005, 1020, 1035 can be the same or differ from one another.

FIG. 10B shows a closeup of the spherical element 1030, with a shaft 1045 positioned in the channel 1015. In some embodiments, the shaft 1045 can also be coated or be covered with a wear sleeve 1055 to reduce friction and to improve the seal, according to an embodiment of the present disclosure. In some embodiments, the shaft 1045 is made of a wear-resistant material, such as a Nitronic™ alloy. Nitronic is the trade name for a collection of nitrogen-strengthened stainless steel alloys. They are austenitic stainless steels (e.g., Nitronic 60).

FIG. 10A also illustrates an example of another embodiment of the BFT assembly of FIG. 5B, where flexible spring elements 1040, 1042 are stacked on one side of the bulkhead 1050, requiring only two flanges 1060, 1065 for assembly. In such a scenario, the flexible spring elements 1040, 1042 have a radius smaller than that of the bulkhead opening, providing a requisite gap 1070 for sliding motion. Advantages of this configuration (relative to the BFT assembly 500 described above with reference to FIG. 5B above) include reduced weight and assembly complexity.

In some embodiments, at least a portion of a BFT assembly is manufactured with an electroforming technique, which combines ease of assembly with lower cost and lighter weight. The electroforming process provides high precision and is more economical than other manufacturing methods.

Electroforming is a metal-forming process for fabrication using electrodeposition on a model, referred to as mandrel. The outer surface of the mandrel forms the inner surface of the desired form. The process passes direct current through an electrolyte containing salts of the metal being electroformed. The anode is the solid metal being electroformed, and the cathode is the mandrel, onto which the electroform gets plated (deposited). The process continues until the required electroform thickness is achieved. The mandrel is then removed by physical separation, melting, or dissolving it away. The surface of the finished part that was in intimate contact with the mandrel—e.g., the channel of the feed-through—is replicated in fine detail with respect to the original, and is not subject to the shrinkage that would normally be experienced in a foundry cast metal object, or have the tool marks of a milled part.

As a result of the electroforming process, UX and ROTX motion of the shaft is smooth due to the lack of flaws or other irregularities that would cause rubbing and damage to the shaft during such motion. This permits a high-quality fit of the shaft to the channel, without requiring high manufacturing tolerances, and helps to prevent seizure of the shaft within the channel.

Candidate materials used in the electroforming process, especially for (but not limited to) the convolution sections and the channel, include nickel or high-strength alloys thereof. The electroforming process facilitates variable stiffness and thickness of the convolution sections relative to other portions of the bulkhead feed-through assembly. The expendable mandrel is made of materials such as aluminum or other compatible, dissolvable and easy-to-machine metals. A benefit of aluminum is that it provides a great ease of machining, and then can be dissolved out of the electroform in sodium hydroxide. In other embodiments, other manufacturing methods may also be used to manufacture at least portions of the bulkhead feed-through assembly, including deep drawing, cold forming (rolling), stamping, and hydroforming. In some embodiments, other members and components of the assembly are made of steel, Inconel (R), or other suitable metals that meet the fire, vibratory, and wear requirements.

Further aspects of the present disclosure are provided by the subject matter of the following clauses.

A feed-through assembly for a bulkhead, the feed-through assembly including a channel configured to extend through the bulkhead and to allow a component to pass through the channel from a first side of the bulkhead to a second side of the bulkhead, and at least one convolution section extending around an end of the channel, where the convolution section is configured to allow a transverse deflection and a tilt of the component.

The feed-through assembly of any preceding clause, where the convolution section is a first convolution section, the end of the channel is disposed on the first side of the bulkhead, the feed-through assembly includes a second convolution section extending around another end of the channel that is disposed on the second side of the bulkhead, and the second convolution section is configured to allow, in cooperation with the first convolution section, the transverse deflection and the tilt of the component.

The feed-through assembly of any preceding clause, where the first convolution section extends annularly around the end of the channel on the first side of the bulkhead, and the second convolution section extends annularly around the other end of the channel on the second side of the bulkhead.

The feed-through assembly of any preceding clause, where the at least one convolution section is configured to allow movement of the component relative to the bulkhead by at least one of compression and expansion of at least a portion of the convolution section.

The feed-through assembly of any preceding clause, where the portion of the convolution section includes at least one flexible component and a plurality of inflexible components, and compression and expansion of the portion of the convolution section includes movement of the at least one flexible component and the inflexible components.

The feed-through assembly of any preceding clause, where the at least one flexible component is a curved component, and movement of the at least one flexible component includes a change in a radius of curvature of the curved component.

The feed-through assembly of any preceding clause, where the inflexible components of the convolution section are straight components, and movement of the inflexible components includes a change in a distance between at least two straight components.

The feed-through assembly of any preceding clause, where the transverse deflection is a movement of the component within the channel in any direction perpendicular to a long axis of the channel.

The feed-through assembly of any preceding clause, where the tilt is a movement of the component causing the component to pass through the bulkhead at an oblique angle relative to a surface of the bulkhead.

The feed-through assembly of any preceding clause, where movement of the component relative to the bulkhead includes a sliding of the component through the channel.

The feed-through assembly of any preceding clause, where movement of the component relative to the bulkhead includes an axial rotation of the component.

The feed-through assembly of any preceding clause, where movement of the component relative to the bulkhead includes a vibrational movement of the component in the channel.

The feed-through assembly of any preceding clause, where the bulkhead is a fire barrier, and the convolution section exerts a force coupling the component to the channel to prevent, during movement of the component relative to the bulkhead, opening a pathway for fire through the bulkhead.

The feed-through assembly of any preceding clause, where the convolution section is in a compressed state when installed in the bulkhead with the component, the compressed state exerting the force coupling the component to the channel.

The feed-through assembly of any preceding clause, further including a spherical section surrounding the channel, and a race section of an annular shape positioned to surround the spherical section and configured to allow the spherical section to rotate in any direction, where the tilt is a first tilt, and the spherical section is configured to allow a second tilt of the component relative to the bulkhead by rotating within the race section.

The feed-through assembly of any preceding clause, further including a first flexible element of an annular shape and positioned to surround the race section on the first side of the bulkhead, and a second flexible element of an annular shape and positioned to surround the race section on the second side of the bulkhead, where the first flexible element and the second flexible element are coupled to each other with a plurality of flanges that are coupled to the bulkhead, and where the transverse deflection is a first transverse deflection, and the first flexible element and the second flexible element are both configured to allow a second transverse deflection of the component relative to the bulkhead, and the second transverse deflection is a transverse sliding of the feed-through assembly in any direction along the bulkhead.

The feed-through assembly of any preceding clause, further including a dry film lubricant applied to an interior surface of the race section, where the dry film lubricant is at least one selected from polytetrafluoroethylene (PTFE), graphite, and molybdenum disulfide.

The feed-through assembly of any preceding clause, where the convolution section is a first convolution section, the transverse deflection is a first transverse deflection, and the tilt is a first tilt, and the feed-through assembly further includes a second convolution section of an annular shape extending around the first convolution section, where the second convolution section is configured to allow movement of the component relative to the bulkhead, and where the movement of the component relative to the bulkhead allowed by the second convolution section includes a second transverse deflection and a second tilt.

The feed-through assembly of any preceding clause, where the end of the channel is disposed on the first side of the bulkhead, and the feed-through assembly further includes a third convolution section extending around another end of the channel that is disposed on the second side of the bulkhead, where the third convolution section is configured to allow, in cooperation with the first convolution section, the first transverse deflection and the first tilt of the component, and a fourth convolution section extending around the third convolution section, where the fourth convolution section is configured to allow, in cooperation with the second convolution section, the second transverse deflection and the second tilt of the component.

The feed-through assembly of any preceding clause, where the first convolution section extends annularly around the end of the channel on the first side of the bulkhead, the third convolution section extends annularly around the other end of the channel on the second side of the bulkhead, the second convolution section extends annularly around the first convolution section, and the fourth convolution section extends annularly around the third convolution section.

The feed-through assembly of any preceding clause, where the second transverse deflection is a movement of the component within the channel in any direction perpendicular to a long axis of the channel.

The feed-through assembly of any preceding clause, where the second tilt is a movement of the component causing the component to pass through the bulkhead at an oblique angle relative to a surface of the bulkhead.

The feed-through assembly of any preceding clause, where the second convolution section is configured to allow movement of the component relative to the bulkhead by at least one of compression and expansion of at least a portion of the second convolution section.

The feed-through assembly of any preceding clause, where the second convolution section has a greater stiffness than that of the first convolution section.

The feed-through assembly of any preceding clause, where the first convolution section has a thickness of twenty millimeters (mm), the second convolution section has a thickness of fifty mm, and other sections of the feed-through assembly have a thickness greater than fifty mm.

The feed-through assembly of any preceding clause, where the feed-through assembly includes two sections, where each section includes half of the channel, half of the first convolution section, and half of the second convolution section, where one section partially overlaps the other section.

The feed-through assembly of any preceding clause, where the feed-through assembly is manufactured using an electroforming technique, and the feed-through assembly is comprised of at least one of nickel and a high-strength nickel alloy.

The feed-through assembly of any preceding clause, further including a dry film lubricant applied to an interior surface of the channel, where the dry film lubricant is at least one selected from polytetrafluoroethylene (PTFE), graphite, and molybdenum disulfide.

The feed-through assembly of any preceding clause, where the component includes at least one of a moving shaft, a rotating shaft, a control rod, an actuator, a static conduit, a cable, a tube, a pipe, a fuel line, a wire, and a harness.

The feed-through assembly of any preceding clause, where the convolution section has a thickness in a range from ten millimeters (mm) to sixty mm.

The feed-through assembly of any preceding clause, where other sections of the feed-through assembly have a thickness greater than the thickness of the convolution section.

The feed-through assembly of any preceding clause, where the convolution section has a periodic profile shape, and the periodic profile shape is one of a wave profile, a corrugated U-shaped profile, a zig-zag profile, and a corrugated omega-shaped profile.

A feed-through assembly for a bulkhead, the feed-through assembly including a channel having a first end and a second end, where the channel is configured to extend through the bulkhead and is configured to allow a component to pass through the channel from a first side of the bulkhead to a second side of the bulkhead, a first convolution section extending annularly around the first end of the channel on the first side of the bulkhead, and a second convolution section extending annularly around the second end of the channel on the second side of the bulkhead, where the first and second convolution sections are configured to allow movement of the component relative to the bulkhead, and where the movement of the component relative to the bulkhead allowed by the first and second convolution sections includes a transverse deflection and a tilt.

The feed-through assembly of any preceding clause, further including a third convolution section of an annular shape surrounding the first convolution section, and a fourth convolution section of an annular shape surrounding the second convolution section, where each of the third and fourth convolution sections is configured to allow movement of the component relative to the bulkhead, where the transverse deflection is a first transverse deflection, the tilt is a first tilt, and where the movement of the component relative to the bulkhead allowed by the third and fourth convolution sections includes a second transverse deflection and a second tilt.

Although the foregoing description is directed to certain embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A feed-through assembly for a bulkhead, the feed-through assembly comprising:
 a channel configured to extend through the bulkhead and to allow a component to pass through the channel from a first side of the bulkhead to a second side of the bulkhead; and
 at least one convolution section extending around an end of the channel, wherein the convolution section is configured to allow a transverse deflection and a tilt of the component,
 wherein the at least one convolution section is configured to allow movement of the component relative to the bulkhead by at least one of compression and expansion of at least a portion of the at least one convolution section, and
 wherein the portion of the at least one convolution section comprises at least one flexible component and a plurality of inflexible components, and compression and expansion of the portion of the at least one convolution section comprises movement of the at least one flexible component and the inflexible components.

2. The feed-through assembly of claim 1, wherein the at least one convolution section is a first convolution section, the end of the channel is disposed on the first side of the bulkhead, the feed-through assembly comprises a second convolution section extending around another end of the channel that is disposed on the second side of the bulkhead, and the second convolution section is configured to allow, in cooperation with the first convolution section, the transverse deflection and the tilt of the component.

3. The feed-through assembly of claim 1, wherein the at least one flexible component is a curved component, and movement of the at least one flexible component comprises a change in a radius of curvature of the curved component, and wherein the inflexible components of the at least one convolution section are straight components, and movement of the inflexible components comprises a change in a distance between at least two straight components.

4. The feed-through assembly of claim 1, wherein the transverse deflection is a movement of the component within the channel in any direction perpendicular to a long axis of the channel, and wherein the tilt is a movement of the component causing the component to pass through the bulkhead at an oblique angle relative to a surface of the bulkhead.

5. The feed-through assembly of claim 1, wherein movement of the component relative to the bulkhead comprises at least one of a sliding of the component through the channel, an axial rotation of the component, and a vibrational movement of the component in the channel.

6. The feed-through assembly of claim 1, wherein the bulkhead is a fire barrier, and the at least one convolution section exerts a force coupling the component to the channel to prevent, during movement of the component relative to the bulkhead, opening a pathway for fire through the bulkhead, and
wherein the at least one convolution section is in a compressed state when installed in the bulkhead with the component, the compressed state exerting the force coupling the component to the channel.

7. A feed-through assembly for a bulkhead, the feed-through assembly comprising:
a channel configured to extend through the bulkhead and to allow a component to pass through the channel from a first side of the bulkhead to a second side of the bulkhead;
at least one convolution section extending around an end of the channel, wherein the at least one convolution section is configured to allow a transverse deflection and a tilt of the component;
a spherical section surrounding the channel; and
a race section of an annular shape positioned to surround the spherical section and configured to allow the spherical section to rotate in any direction,
wherein the tilt is a first tilt, and the spherical section is configured to allow a second tilt of the component relative to the bulkhead by rotating within the race section.

8. The feed-through assembly of claim 7, further comprising:
a first flexible element of an annular shape and positioned to surround the race section on the first side of the bulkhead; and
a second flexible element of an annular shape and positioned to surround the race section on the second side of the bulkhead,
wherein the first flexible element and the second flexible element are coupled to each other with a plurality of flanges that are coupled to the bulkhead, and
wherein the transverse deflection is a first transverse deflection, and the first flexible element and the second flexible element are both configured to allow a second transverse deflection of the component relative to the bulkhead, and the second transverse deflection is a transverse sliding of the feed-through assembly in any direction along the bulkhead.

9. The feed-through assembly of claim 7, further comprising a dry film lubricant applied to an interior surface of the race section, wherein the dry film lubricant is at least one selected from polytetrafluoroethylene (PTFE), graphite, and molybdenum disulfide.

10. A feed-through assembly for a bulkhead, the feed-through assembly comprising:
a channel configured to extend through the bulkhead and to allow a component to pass through the channel from a first side of the bulkhead to a second side of the bulkhead;
a first convolution section extending around an end of the channel, wherein the first convolution section is configured to allow a first transverse deflection and a first tilt of the component; and
a second convolution section of an annular shape extending around the first convolution section, wherein the second convolution section is configured to allow movement of the component relative to the bulkhead,
wherein the movement of the component relative to the bulkhead allowed by the second convolution section comprises a second transverse deflection and a second tilt.

11. The feed-through assembly of claim 10, wherein the end of the channel is disposed on the first side of the bulkhead, and the feed-through assembly further comprises:
a third convolution section extending around another end of the channel that is disposed on the second side of the bulkhead, wherein the third convolution section is configured to allow, in cooperation with the first convolution section, the first transverse deflection and the first tilt of the component; and
a fourth convolution section extending around the third convolution section, wherein the fourth convolution section is configured to allow, in cooperation with the second convolution section, the second transverse deflection and the second tilt of the component.

12. The feed-through assembly of claim 10, wherein the second transverse deflection is a movement of the component within the channel in any direction perpendicular to a long axis of the channel, and
wherein the second tilt is a movement of the component causing the component to pass through the bulkhead at an oblique angle relative to a surface of the bulkhead.

13. The feed-through assembly of claim 10, wherein the second convolution section is configured to allow movement of the component relative to the bulkhead by at least one of compression and expansion of at least a portion of the second convolution section.

14. The feed-through assembly of claim 10, wherein the first convolution section has a thickness of twenty millimeters (mm), the second convolution section has a thickness of fifty mm, and other sections of the feed-through assembly have a thickness greater than fifty mm.

15. The feed-through assembly of claim 1, wherein the feed-through assembly is manufactured using an electroforming technique, and the feed-through assembly is comprised of at least one of nickel and a high-strength nickel alloy.

16. The feed-through assembly of claim 1, further comprising a dry film lubricant applied to an interior surface of the channel, wherein the dry film lubricant is at least one selected from polytetrafluoroethylene (PTFE), graphite, and molybdenum disulfide.

17. The feed-through assembly of claim 1, wherein the component comprises at least one of a moving shaft, a rotating shaft, a control rod, an actuator, a static conduit, a cable, a tube, a pipe, a fuel line, a wire, and a harness.

18. The feed-through assembly of claim 1, wherein the at least one convolution section has a thickness in a range from ten millimeters (mm) to sixty mm, and other sections of the feed-through assembly have a thickness greater than the thickness of the at least one convolution section.

19. The feed-through assembly of claim 1, wherein the at least one convolution section has a periodic profile shape, and the periodic profile shape is one of a wave profile, a corrugated U-shaped profile, a zig-zag profile, and a corrugated omega-shaped profile.

* * * * *